US008149671B2

(12) United States Patent  (10) Patent No.: US 8,149,671 B2
Sato et al.  (45) Date of Patent: Apr. 3, 2012

(54) OPTICAL DISC AND OPTICAL DISC DEVICE

(75) Inventors: Takahiro Sato, Osaka (JP); Takeshi Shimamoto, Osaka (JP); Katsuya Watanabe, Nara (JP)

(73) Assignee: Panasonic Corporation, Osaka (JP)

( * ) Notice: Subject to any disclaimer, the term of this patent is extended or adjusted under 35 U.S.C. 154(b) by 482 days.

(21) Appl. No.: 12/088,460

(22) PCT Filed: Nov. 22, 2006

(86) PCT No.: PCT/JP2006/323282
§ 371 (c)(1),
(2), (4) Date: Mar. 28, 2008

(87) PCT Pub. No.: WO2007/060975
PCT Pub. Date: May 31, 2007

(65) Prior Publication Data
US 2009/0154324 A1  Jun. 18, 2009

(30) Foreign Application Priority Data

Nov. 22, 2005 (JP) .................................. 2005-336543

(51) Int. Cl.
*G11B 20/00* (2006.01)
(52) U.S. Cl. ............... 369/53.45; 369/34.01; 369/47.22; 369/47.27; 369/47.53; 369/53.44; 369/112.23; 369/279
(58) Field of Classification Search .................. None
See application file for complete search history.

(56) References Cited

U.S. PATENT DOCUMENTS

| 2003/0137915 | A1 | 7/2003 | Shoji et al. | |
| 2005/0025005 | A1* | 2/2005 | Hwang et al. | 369/47.21 |
| 2005/0226133 | A1 | 10/2005 | Ueki | |

FOREIGN PATENT DOCUMENTS

EP  0807926 A1  11/1997
(Continued)

OTHER PUBLICATIONS

Extended European Search Report for corresponding application No. EP 06823509.2 dated Feb. 22, 2010.
(Continued)

*Primary Examiner* — Joseph Haley
*Assistant Examiner* — Ifedayo Iluyomade
(74) *Attorney, Agent, or Firm* — Renner, Otto, Boisselle & Sklar, LLP

(57) ABSTRACT

An optical disc drive according to the present invention can read and/or write data from/on an optical disc with information layers including first and second information layers (L0 and L1). The drive includes: an objective lens for converging a light beam; a lens actuator for driving the lens; a photodetector section that receives the beam reflected from the disc and converts it into an electrical signal; and a control section for determining the values of a first group of parameters, which are set to read data from the first layer (L0), and those of a second group of parameters, which are set to read data from the second layer (L1), during a disc loading process. In performing the disc loading process, the control section determines the values of the first group of parameters, and then determines the values of the second group of parameters based on correlation information, representing correlation between the values of the first and second groups of parameters that were set during a previous disc loading process, and on the values of the first group of parameters that have been just determined during the current disc loading process.

18 Claims, 22 Drawing Sheets

FOREIGN PATENT DOCUMENTS

| | | | |
|---|---|---|---|
| EP | 1111602 | * | 6/2001 |
| EP | 1111602 | A2 | 6/2001 |
| JP | 10-134375 | | 5/1998 |
| JP | 11-003550 | | 1/1999 |
| JP | 11003550 | * | 1/1999 |
| JP | 2001-319332 | | 11/2001 |
| JP | 2003-030830 | | 1/2003 |
| JP | 2003-030838 | | 1/2003 |
| JP | 2003030838 | * | 1/2003 |
| JP | 2005-063504 | | 3/2005 |
| JP | 2005-259257 | | 9/2005 |

OTHER PUBLICATIONS

International Search Report for corresponding Application No. PCT/JP2006/323282 dated Feb. 27, 2007.

Form PCT/ISA/237 and partial English translation.

Form PCT/ISA/237 and partial English translation for corresponding International Application No. PCT/JP2006/323282 dated Feb. 27, 2007 (previously submitted with IDS on Mar. 28, 2008).

* cited by examiner

FIG.20

(a)
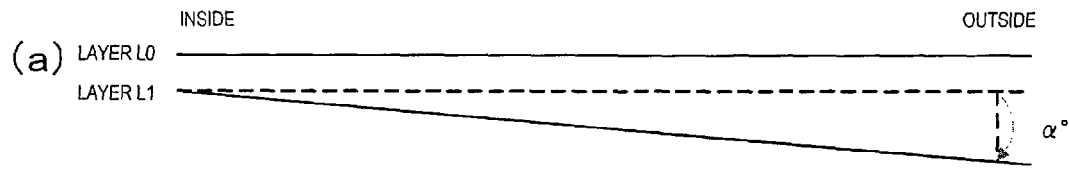

| RADIAL LOCATION | 24mm | 32mm | 40mm | 48mm | 56mm |
|---|---|---|---|---|---|
| TILT (L0) | 0 | 0 | 0 | 0 | 0 |
| TILT (L1) | $\alpha$ | $\alpha$ | $\alpha$ | $\alpha$ | $\alpha$ |

(b)
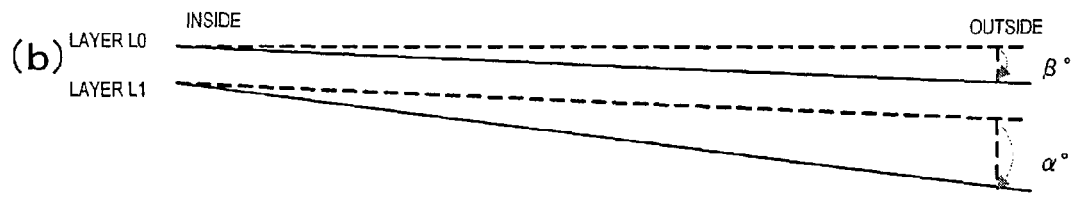

| RADIAL LOCATION | 24mm | 32mm | 40mm | 48mm | 56mm |
|---|---|---|---|---|---|
| TILT (L0) | $\beta$ | $\beta$ | $\beta$ | $\beta$ | $\beta$ |
| TILT (L1) | $\beta+\alpha$ | $\beta+\alpha$ | $\beta+\alpha$ | $\beta+\alpha$ | $\beta+\alpha$ |

(c)
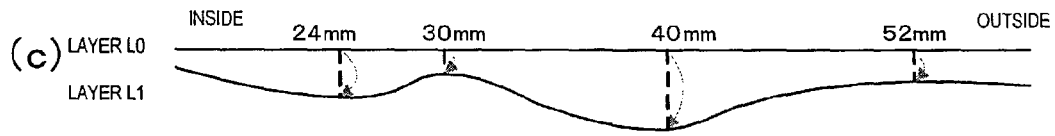

| RADIAL LOCATION | 24~30mm | 30~40mm | 40~52mm | 52~56mm |
|---|---|---|---|---|
| TILT (L0) | 0 | 0 | 0 | 0 |
| TILT (L1) | $\theta$ | $\iota$ | $\varepsilon$ | $\kappa$ |

(d)
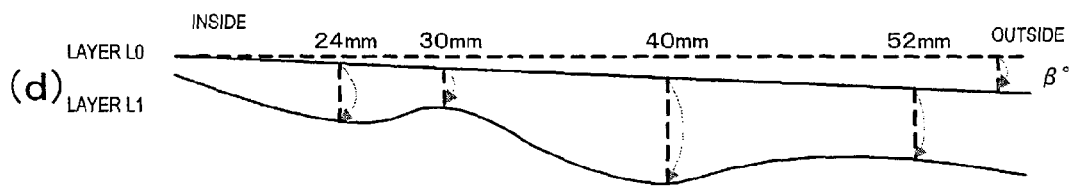

| RADIAL LOCATION | 24~30mm | 30~40mm | 40~52mm | 52~56mm |
|---|---|---|---|---|
| TILT (L0) | $\beta$ | $\beta$ | $\beta$ | $\beta$ |
| TILT (L1) | $\beta+\theta$ | $\beta+\iota$ | $\beta+\varepsilon$ | $\beta+\kappa$ |

CONVENTIONAL ART

OPTICAL DISC AND OPTICAL DISC DEVICE

TECHNICAL FIELD

The present invention relates to an optical disc drive for reading and/or writing (or reproducing and/or recording) data from/on a disklike information storage medium (which will be referred to herein as an "optical disc"). More particularly, the present invention relates to an optical disc drive that can get a disc loading process done quickly on an optical disc with multiple information layers and also relates to an optical disc for use in such an optical disc drive.

BACKGROUND ART

Data stored on an optical disc can be read out from the disc by irradiating the rotating disc with a relatively weak light beam with a constant intensity, and detecting the light that has been modulated by, and reflected from, the optical disc.

On a read-only optical disc, information is already stored as pits that are arranged spirally during the manufacturing process of the optical disc. On the other hand, on a rewritable optical disc, a recording material film, from/on which data can be read and written optically, is deposited by an evaporation process, for example, on the surface of a base material on which tracks with spiral lands or grooves are arranged. In writing data on such a rewritable optical disc, data is written there by irradiating the optical disc with a light beam, of which the optical power has been changed according to the data to be written, and locally changing the property of the recording material film.

It should be noted that the depth of the pits, the depth of the tracks, and the thickness of the recording material film are all smaller than the thickness of the optical disc base material. For that reason, those portions of the optical disc, where data is stored, define a two-dimensional plane, which is sometimes called a "storage plane". However, considering that such a "storage plane" actually has a physical dimension in the depth direction, too, the term "storage plane" will be replaced herein by another term "information layer". Every optical disc has at least one such information layer. Optionally, a single information layer may actually include a plurality of layers such as a phase-change material layer and a reflective layer.

To read data that is stored on a recordable optical disc or to write data on such an optical disc, the light beam always needs to maintain a predetermined converging state on a target track on an information layer. For that purpose, a "focus control" and a "tracking control" are required. The "focus control" means controlling the position of an objective lens perpendicularly to the information storage plane such that the focus position of the light beam is always located on the information layer. On the other hand, the "tracking control" means controlling the position of the objective lens along the radius of a given optical disc (which direction will be referred to herein as a "disc radial direction") such that the light beam spot is always located right on a target track.

Various types of optical discs such as DVD (digital versatile disc)-ROM, DVD-RAM, DVD-RW, DVD-R, DVD+RW and DVD+R have become more and more popular these days as storage media on which a huge amount of information can be stored at a high density. Meanwhile, CDs (compact discs) are still popular now. Currently, next-generation optical discs, including Blu-ray disc (BD), which can store an even greater amount of information at a much higher density than any of these optical discs, are under development, and some of them have already been put on the market.

The physical structures of these optical discs change from one type to another. For example, these optical discs are different in physical track structure, track pitch, and depth of the information layer (i.e., the distance from the surface of the optical disc, through which the incoming light enters the disc, to the information layer). To read or write data properly from/on these multiple types of optical discs with those various physical structures, the information layer of each of these optical discs needs to be irradiated with a light beam with an appropriate wavelength by using an optical system that has a numerical aperture (NA) associated with the specific type of the disc.

Recently, an optical disc with two information layers that are stacked in the depth direction has come up as a storage medium with huge storage capacity, and optical disc drives compatible with such optical discs have been put on the market everywhere.

The best conditions for servo controls and servo signals that are required to perform read and write operations on an optical disc vary due to differences in property or characteristic between respective optical disc drives or between optical discs and depending on the temperature conditions during the read or write operation. That is why to perform a read or write operation on an information layer of an optical disc, a so-called "disc loading process", which is initial adjustment of servo controls and signals, needs to get done following a predetermined procedure.

By performing the disc loading process, the read or write operation can be performed in the best condition on the information layer of the optical disc. However, the greater the number of information layers, the longer it will take to get the disc loading process done and the longer the user will have to wait until the read or write operation can be actually started. This is because the initial adjustment needs to be made on each of those information layers.

Patent Document No. 1 discloses a technique for overcoming such a problem. FIG. 23 is a flowchart showing the procedure of a disc loading process for a dual-layer disc as disclosed in Patent Document No. 1. It should be noted that only a few adjustment-related processing steps are extracted from the disc loading procedure and shown in FIG. 23 and that the timings to turn ON a disc motor or start a focus control could be set arbitrarily.

First, in Step 701 shown in FIG. 23, adjustment is made on the first information layer. Next, in Step 702, a focus jump is done from the first information layer to the second information layer. Then, in Step 703, the result of the adjustment that has been made on the first information layer is set as an initial value of adjustment to be made on the second information layer. Subsequently, in Step 704, using the value that has been set in the previous processing step 703 as an initial value, adjustment is made on the second information layer to end the disc loading process.

According to this disc loading procedure, if the adjustments are made without depending on the properties of the information layers, the result of adjustment on the first information layer will be close to that of adjustment on the second information layer. Therefore, adjustment is made on the second information layer using the result of adjustment on the first information layer as an initial value. Consequently, adjustment can be done on the second information layer in a short time.

Patent Document No. 1: Japanese Patent Application Laid-Open Publication No. 2001-319332

DISCLOSURE OF INVENTION

Problems to be Solved by the Invention

According to the conventional technique described above, however, if read/write parameters that depend on the properties of respective information layers should be figured out by making those adjustments, then it would take a lot of time to get the adjustments done (i.e., until the best adjustments results are obtained). If the initial value of adjustment is set appropriately, then the adjustment can be converged in a sufficiently shorter time. Even so, the contents of the adjustment processing itself remain the same, and the effect of shortening the adjustment time is still not satisfactory.

An object of the present invention is to provide an optical disc drive that reads or writes from/to each of multiple information layers stacked in a disc and that can get a disc loading process done in a short time and start a read or write operation quickly after the drive has been turned ON.

Means for Solving the Problems

An optical disc drive according to the present invention can read and/or write data from/on an optical disc with multiple information layers including a first information layer and a second information layer. The drive includes: an objective lens for converging a light beam; a lens actuator for driving the objective lens; a photodetector section, which receives the light beam that has been reflected from the optical disc and converts the received light beam into an electrical signal; and a control section for determining the values of a first group of parameters, which are set to read data from the first information layer, and those of a second group of parameters, which are set to read data from the second information layer, during a disc loading process. In performing the disc loading process, the control section determines the values of the first group of parameters first, and then determines the values of the second group of parameters based on correlation information, representing correlation between the values of the first and second groups of parameters that were set during a previous disc loading process, and on the values of the first group of parameters that have just been determined during the current disc loading process.

In one preferred embodiment, the correlation information is differences between the values of the first and second groups of parameters that were set during the previous disc loading process.

In another preferred embodiment, the control section retrieves the values of the first and second groups of parameters that were set during the previous disc loading process from the first information layer of the optical disc.

In still another preferred embodiment, the optical disc drive further includes a memory for storing the values of the first and second groups of parameters, which were set during the previous disc loading process, in association with Disc ID information of the optical disc. In performing the current disc loading process, the control section determines the values of the first group of parameters first, reads out the Disc ID information from the first information layer of the optical disc, and then retrieves the values of the first and second groups of parameters, which are associated with the Disc ID information, from the memory.

In yet another preferred embodiment, the first group of parameters includes a parameter that defines a converging state of the light beam at the first information layer when data is read from the first information layer, and the second group of parameters includes a parameter that defines a converging state of the light beam at the second information layer when data is read from the second information layer.

In yet another preferred embodiment, the first group of parameters includes information that defines the magnitude of spherical aberration correction to be made on the light beam at the first information layer, and the second group of parameters includes information that defines the magnitude of spherical aberration correction to be made on the light beam at the second information layer.

In yet another preferred embodiment, the first group of parameters includes information about the tilt or the degree of eccentricity of the first information layer, and the second group of parameters includes information about the tilt or the degree of eccentricity of the second information layer.

In yet another preferred embodiment, the control section determines, by the values of the first group of parameters that were set during the previous disc loading process, whether or not the correlation information should be used to determine the values of the second group of parameters during the current disc loading process.

In a specific preferred embodiment, the first group of parameters that were set during the previous disc loading process includes temperature information about a temperature during the previous disc loading process.

In another specific preferred embodiment, if it has been determined that the correlation information not be used, the control section determines the values of the second group of parameters by actually irradiating the second information layer of the optical disc with the light beam.

In yet another preferred embodiment, if the values of the first and second groups of parameters, which were set during the previous disc loading process, are not available during the current disc loading process, the control section determines the values of the second group of parameters by actually irradiating the second information layer of the optical disc with the light beam.

In yet another preferred embodiment, if the values of the first and second groups of parameters that were set during the previous disc loading process are stored in the first information layer of the optical disc and if those values were set by a different device from the given optical disc drive, the control section uses the correlation information after having corrected the information.

In yet another preferred embodiment, the control section gets a device ID, which identifies an optical disc drive that stored the values of the first and second groups of parameters on the first information layer of the optical disc, from the optical disc, and corrects the correlation information according to the device ID.

In yet another preferred embodiment, the control section stores the values of the first and second groups of parameters that have just been determined during the current disc loading process on the first information layer of the optical disc.

In yet another preferred embodiment, the control section corrects the values of the first and second groups of parameters, which have just been determined during the current disc loading process, such that another optical disc drive can use the values and then stores the values in the first information layer of the optical disc.

In yet another preferred embodiment, the control section stores not only the values of the first and second groups of parameters that have just been determined during the current disc loading process but also a device ID to identify the given optical disc drive on the first information layer of the optical disc.

In yet another preferred embodiment, the optical disc drive further includes a memory for storing the values of the first and second groups of parameters in conjunction with a Disc ID that identifies their associated optical disc. The control section stores the values of the first and second groups of parameters that have just been determined during the current disc loading process in the memory in association with the Disc ID of the optical disc.

An optical disc according to the present invention has a plurality of information layers including a first information layer and a second information layer. Values of a first group of parameters that are set to read data from the first information layer and those of a second group of parameters that are set to read data from the second information layer are stored in the first information layer.

In one preferred embodiment, the first group of parameters includes information that defines the magnitude of spherical aberration correction to be made on the light beam at the first information layer, and the second group of parameters includes information that defines the magnitude of spherical aberration correction to be made on the light beam at the second information layer.

In another preferred embodiment, the values of the first and second groups of parameters have already been stored when the optical disc is shipped.

Effects of the Invention

According to the present invention, an optical disc drive for reading and/or writing from/to an optical disc with multiple information layers can get ready to start a read or write operation in a shorter time and the user has to wait a shorter time, too. As a result, the user will not miss a portion of the program he or she wants to record or lose a significant portion of a shooting period. In addition, he or she can use this drive much more easily. Furthermore, when an optical disc with three, four or more information layers comes up in the near future, the effect of shortening the startup time will get even more significant.

BRIEF DESCRIPTION OF DRAWINGS

FIGS. 20(a) through 20(d) are cross-sectional views schematically illustrating the structures of optical discs, including two information layers that are stacked with a varying gap, along with tables showing the radial location dependences of tilts.

Figure 1:
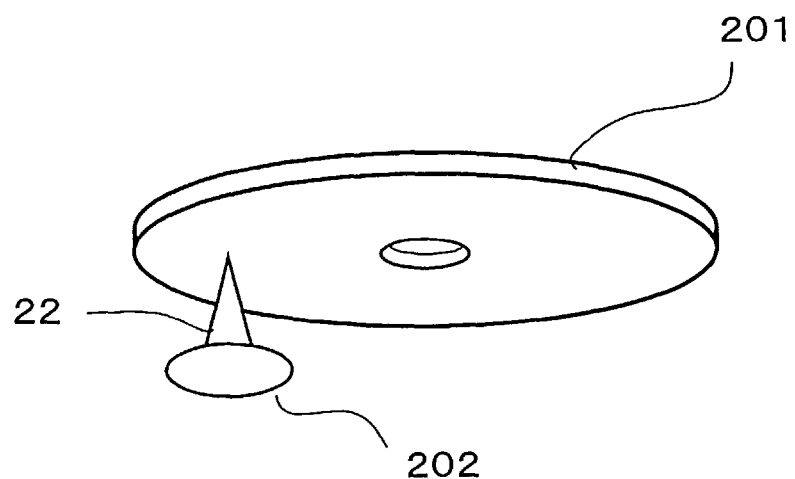
FIG. 1 is a perspective view schematically illustrating the position of an objective lens 202 with respect to an optical disc 201 that has been loaded into an optical disc drive.

| DESCRIPTION OF REFERENCE NUMERALS | |
|---|---|
| 22 | light beam |
| 101 | Blu-ray Disc Rewritable Format |
| 102 | Lead-in Zone (Layer 0) |
| 103 | Data Zone (Layer 0) |
| 104 | Outer Zone |
| 105 | Data Zone (Layer 1) |
| 106 | Lead-out Zone (Layer 1) |
| 107 | disc information area |
| 108 | OPC area |
| 109 | Drive Area |
| 110 | DMA area |
| 111 | invalid Drive Area information |
| 112 | valid Drive Area information |
| 113 | DDS information |
| 114 | invalid DFL information |
| 115 | valid DFL information |
| 116 | device identification information |
| 117 | adjustment parameters (Layer 0) |

-continued

DESCRIPTION OF REFERENCE NUMERALS

| | |
|---|---|
| 118 | adjustment result confirmation information (Layer 0) |
| 119 | adjustment parameters (Layer 1) |
| 120 | adjustment result confirmation information (Layer 1) |
| 121, 122 | spare area |
| 200 | optical disc drive |
| 201 | optical disc |
| 202 | objective lens |
| 203 | actuator |
| 204 | spherical aberration position regulating section |
| 205 | photodetector section |
| 206 | actuator driving section |
| 207 | spherical aberration position driving section |
| 208 | focus error generating section |
| 209 | tracking error generating section |
| 210 | signal reading section |
| 211 | data reading section |
| 212 | servo control section |
| 213 | system control section |
| 214 | disc motor |
| 215 | optical pickup |
| 216 | adjustment parameter processing section |
| 217 | laser light source |
| 218 | writing section |
| 260 | aberration correction lens |
| 301 | adjustment parameters |
| 302 | adjustment result confirmation information |
| 303 | FBAL value as a result of FBAL/BE fine adjustment on Layer L0 |
| 304 | spherical aberration correction position as a result of FBAL/BE fine adjustment on Layer 0 |
| 305 | FBAL value as a result of FBAL/BE fine adjustment on Layer L1 |
| 306 | spherical aberration correction position as a result of FBAL/BE fine adjustment on Layer L1 |
| 307 | temperature during FBAL/BE fine adjustment on Layer 0 |
| 308 | temperature during FBAL/BE fine adjustment on Layer 1 |

BEST MODE FOR CARRYING OUT THE INVENTION

An optical disc according to the present invention is a multilayer optical disc with a plurality of information layers including a first information layer and a second information layer, and the first information layer has a parameter group storage area. This parameter group storage area stores the values of a first group of parameters that are set to read data from the first information layer during a disc loading process and those of a second group of parameters that are set to read data from the second information layer during the disc loading process. The first group of parameters typically includes a parameter defining the converging state of the light beam at the first information layer when data is read from the first information layer, while the second group of parameters typically includes a parameter defining the converging state of the light beam at the second information layer when data is read from the second information layer.

As used herein, the "parameter" defining the converging state of the light beam at each information layer is a piece of information that is needed to optimize the converging state of the light beam at a target information layer of the read/write operation, and may be a numerical value representing the position of an objective lens in an optical pickup, for example.

Hereinafter, such information needed for optimizing the converging state of the light beam will be described.

Figure 2:
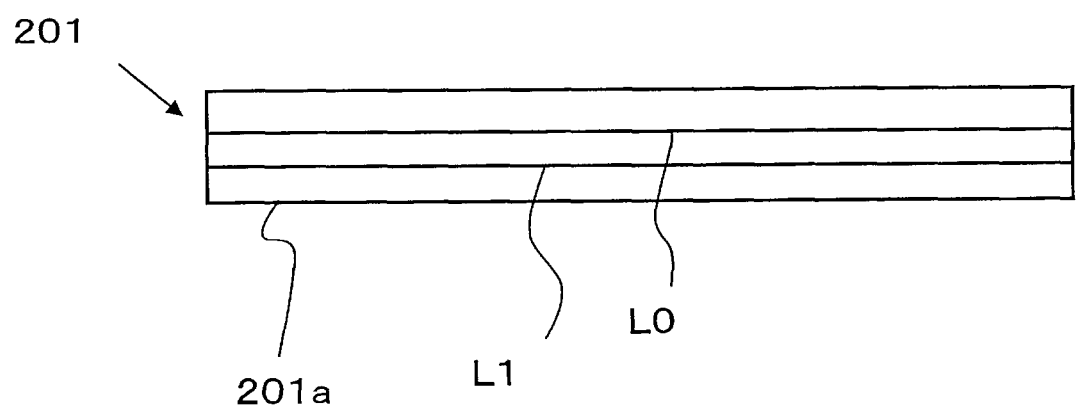
FIG. 2 is a cross-sectional view illustrating the structure of an optical disc 201 with multiple information layers.

First, look at FIG. 1, which is a perspective view illustrating a general arrangement of an objective lens 202 with respect to an optical disc 201. A light beam 22 that has been converged by the objective lens 202 passes through the light incoming side of the optical disc 201 and irradiates an information layer inside the optical disc, thereby forming a light beam spot on the information layer. An example of an optical disc 201 for use in the present invention includes a first information layer (Layer L0), which is located at a deeper level from the light incoming side 201a, and a second information layer (Layer L1), which is located at a shallower level, as shown in FIG. 2. That is why to converge the light beam 22 just as intended on the target information layer (which is either the Layer L0 or the Layer L1) to read from or write to, the position of the objective lens 202 along the optical axis and the tilt angle of the optical axis with respect to the information plane need to be adjusted appropriately.

Among the various types of optical discs mentioned above, a BD requires an objective lens with a high numerical aperture (NA) to converge the light beam, and therefore, the quality of the read signal is easily affected by a spherical aberration. To minimize the spherical aberration, an optical disc drive that can process a BD includes a mechanism for correcting a spherical aberration (which will be referred to herein as a "spherical aberration correcting section") between a light source (not shown) that irradiates the BD with a light beam and the objective lens 202.

Figure 3:
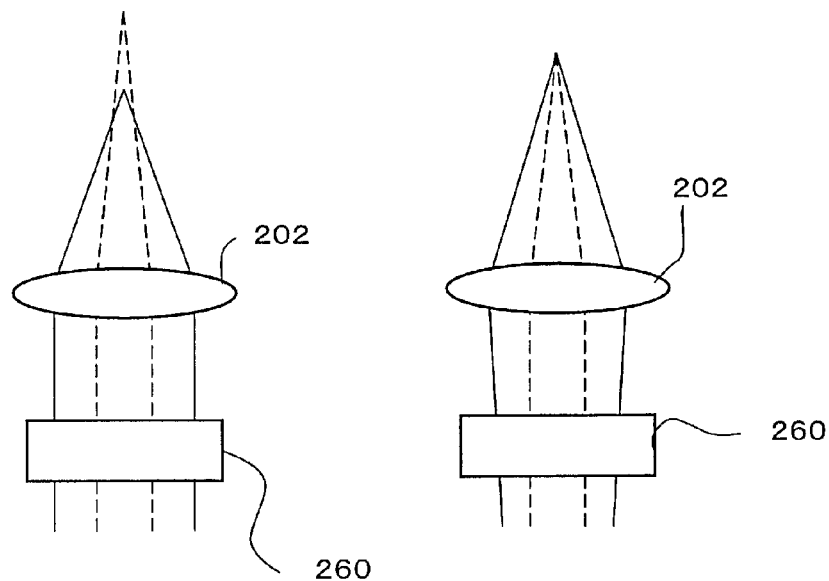
FIG. 3(a) shows a state where spherical aberration has been produced and FIG. 3(b) shows a state where the spherical aberration has been corrected.

As shown in FIG. 3(a), the "spherical aberration" refers to a phenomenon that the focus position shifts in the optical axis direction between a light ray passing through the central portion of the objective lens 202 and a light ray passing through the peripheral portion of the objective lens 202. Thus, the "spherical aberration" sometimes means only the magnitude of that shift. The spherical aberration is variable with the wavelength of the light beam, the numerical aperture (NA) of the objective lens and the transmission layer thickness of the optical disc (i.e., the distance from the surface of the disc to the information layer). Among other things, the spherical aberration depends on the numerical aperture particularly heavily, and changes proportionally to the fourth power of NA. That is why a BD that uses an objective lens with a larger NA than a DVD or a CD is likely to cause a significant spherical aberration, which must be reduced in one way or another.

As used herein, the term "transmission layer thickness" means the distance from the surface of the light incoming side of the optical disc (which will be simply referred to herein as a "disc surface") to the information layer, i.e., the depth of the information storage layer as measured from the surface of the disc. In a single-layer BD including one information layer, the information layer is covered with a coating layer with a thickness of 0.1 mm (approximately 100 μm) and therefore, its transmission layer thickness is invariably defined at 0.1 mm. As for a dual-layer BD including two information layers, one of the two information layers that is more distant from the disc surface (i.e., Layer L0) is covered with a light-transmitting layer with a thickness of about 25 μm, on which the other information layer (Layer L1) is arranged. And this Layer L1 is covered with another light-transmitting layer (coating layer) with a thickness of about 75 μm. Therefore, the transmission layer thickness of the dual-layer BD is about 100 μm as for the Layer L0 but is about 75 μm as for the Layer L1.

It should be noted that even optical discs compliant with Blu-ray Disc Basic Format Specification could cause spherical aberrations of significantly different magnitudes just because the thicknesses of their transmission layers are different or because the optical axis of the light beam is slightly tilted with respect to the information layer. For that reason, during the disc loading process, the magnitude of correction to be made on the aberration needs to be optimized by controlling the spherical aberration correcting section 260 such that the spherical aberration is minimized according to the specification of the optical disc that has been loaded into the optical disc drive. FIG. 3(b) schematically illustrates how the spherical aberration has been corrected substantially perfectly by the spherical aberration correcting section 260.

Figure 4:
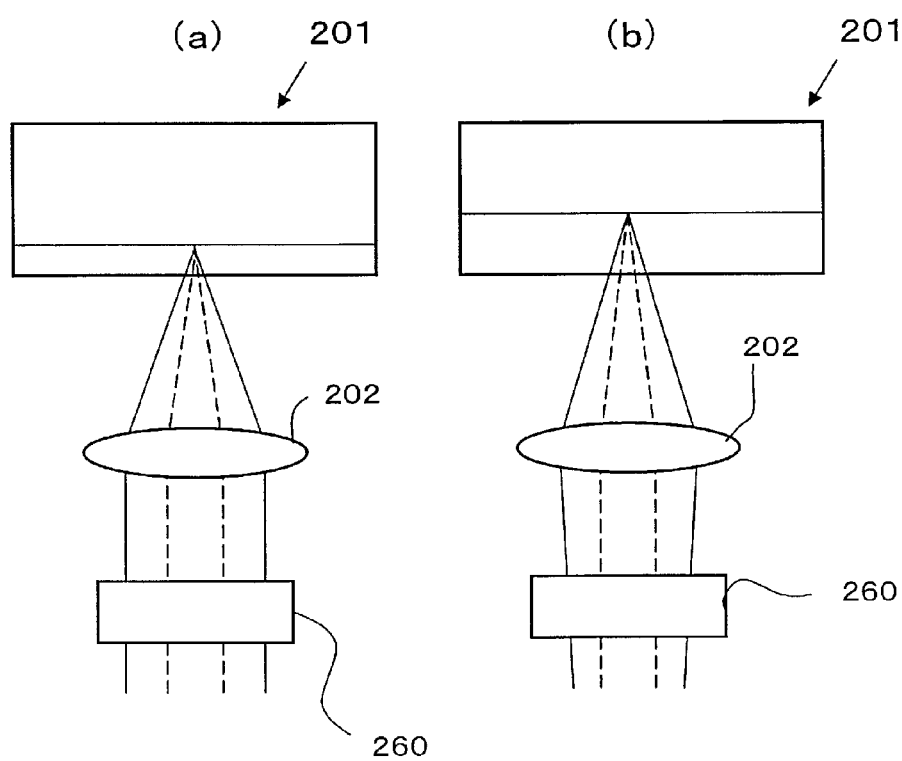
FIG. 4(a) shows how the spherical aberration is minimized on an information layer that is located at a relatively shallow level from the surface of the optical disc 201 and FIG. 4(b) shows how the spherical aberration is minimized on an information layer that is located at a relatively deep level from the surface of the optical disc 201.

FIG. 4(a) illustrates how the spherical aberration is minimized on an information layer that is located at a relatively shallow level as measured from the surface of the optical disc 201. On the other hand, FIG. 4(b) illustrates how the spherical aberration is minimized on an information layer that is located at a relatively deep level as measured from the surface of the optical disc. If the distance from the surface of a given optical disc to its information layer is changeable from one disc to another in this manner, then the spherical aberration needs to be minimized on the information layer by getting the degree of divergence of a light beam, which is going to enter the objective lens 202, regulated by the spherical aberration correcting section 260.

The spherical aberration correcting section 260 includes an aberration correction lens 262 shown in FIGS. 5(a) and 5(b) to regulate the degree of divergence of the light beam that is going to enter the objective lens 202, and can regulate the degree of divergence of the light beam, and eventually control the spherical aberration on the information layer, by changing its positions in the optical axis direction.

In the state shown in FIG. 5(a), the spherical aberration is minimized on the Layer L0, which is located at the deeper level in the optical disc, by moving the aberration correction lens 262 away from the objective lens 202. On the other hand, in the state shown in FIG. 5(b), the spherical aberration is minimized on the Layer L1, which is located at the shallower level in the optical disc, by moving the aberration correction lens 262 toward the objective lens 202.

As shown in FIG. 5(c), the depth of the information layer, on which the spherical aberration is minimized, can be changed by controlling the position of the aberration correction lens 262. For example, if the aberration correction lens 262 is arranged at a position that is 1.66 mm farther away from the objective lens 202 than the driver center position is, the spherical aberration can be minimized on the Layer L0. Meanwhile, if the aberration correction lens 262 is arranged at a position that is 1.11 mm closer to the objective lens 202 than the driver center position is, then the spherical aberration can be minimized on the Layer L1.

In this description, the distance from the surface of the optical disc to the Layer L0 (i.e., the depth of the Layer L0) will sometimes be referred to herein as a "transmission layer thickness of 100 μm" and the distance from the surface of the optical disc to the Layer L1 (i.e., the depth of the Layer L1) will sometimes be referred to herein as a "transmission layer thickness of 75 μm". That is why to form the focal point of the light beam on the Layer L1, not just should the objective lens 202 be displaced in the optical axis direction but also should the aberration correction lens 262 be displaced toward the objective lens by 1.11 mm with respect to the driver center position to correct the aberration appropriately for the transmission layer thickness of 75 μm. Also, to jump the focal point of the light beam from the Layer L1 to the Layer L0, not just should the objective lens 202 be displaced in the optical axis direction but also should the aberration correction lens 262 be displaced away from the objective lens 202 by 1.66 mm with respect to the driver center position to correct the aberration appropriately for the transmission layer thickness of 100 μm. In this case, if only the objective lens 202 were displaced without correcting the aberration appropriately, then the light beam being converged on the Layer L0 would have increased spherical aberration.

As described above, in a BD, not just should the position of the objective lens be adjusted to converge the light beam right on the target information layer but also should the position of the aberration correction lens 262 be adjusted to minimize the aberration correction on that information layer.

Meanwhile, when the focus servo control is ON, the servo control is carried out so as to reduce the amplitude of the S-curve of the focus error signal as close to zero as possible such that the light beam is converged right on the target information layer. In this case, by performing the servo control such that not the zero-cross point where the amplitude of the S-curve gets equal to completely zero but a point that has shifted from the zero-cross point by a predetermined distance is set on target, the quality of the read signal can be improved. To set the focus position of the light beam at such a point that has shifted from the zero-cross point of the S-curve of the focus error signal in this manner is called "defocusing". And a numerical value that defines the degree of this "defocusing" is called a "focus balance". If the magnitude of the focus balance is changed, then the converging state of the light beam on the target information layer changes. In this description, the degree of "defocusing" will sometimes be referred to herein as a "focus position", which may be simply identified by FBAL.

As described above, the aberration correction lens has the function of expanding a light beam (which will be referred to herein as a "beam expanding function"). For that reason, the position where a spherical aberration should be corrected or the magnitude of correction to be made on the spherical aberration will sometimes be identified herein by just "BE".

In the example described above, the focus position FBAL and the spherical aberration correction position BE become important parameters that define the converging state of the light beam.

Also, depending on the angle of incidence of a light beam on an information layer, not just the spherical aberration but also coma aberration are produced. That is why the tilt direction of the optical axis of the objective lens 202 sometimes needs to be adjusted appropriately such that the light beam is incident perpendicularly to the information layer. The angle defined by the optical axis of the objective lens 202 can be controlled by changing the balance between the drive signals to be supplied to the two focus coils of the lens actuator as well as the position of the objective lens 202 in the optical axis direction. To control the angle defined by the optical axis of the objective lens 202 is called a "tilt control". The initial value of the angle defined by the optical axis of the objective lens 202 is zero degrees. However, if the information plane of the optical disc 201 is tilted with respect to a plane that intersects with the optical axis of the objective lens 202 at right angles as described above, then the angle defined by the optical axis of the objective lens 202 is changed so as to agree with the tilt angle. That is to say, a lens tilt is produced. Nevertheless, depending on the angle of the lens tilt, spherical aberration may also be produced. Thus, this is one of parameters that have influence on the converging state of the light beam.

The values of these parameters that have a significant effect on the converging state of the light beam are variable due to a number of factors such as those shown in the following Table 1. These variation factors can be classified into factors that depend on a property of the optical disc drive, factors that depend on a property of the optical disc, and factors that depend on the operation environment.

TABLE 1

| | |
|---|---|
| Dependence on property of optical disc drive | Variation in characteristic between devices such as misalignment during manufacturing |
| Dependence on property of optical disc | Property of recording film, transmission layer thickness, bonding error during manufacturing of optical disc and degree of eccentricity of disc |
| Dependence on environment | Temperature variation |

To actually read and write data from/on a multilayer optical disc, adjustment needs to be made to optimize the converging state of the light beam on each of those information layers right after the optical disc drive has been started. That is to say, depending on the type of the optical disc that has been loaded into the optical disc drive, conditions for adjusting the values of the focus position BAL and the spherical aberration correction position BE and optimizing the positions of the objective lens and the aberration correction lens in the optical axis direction need to be determined in advance. Such adjustment and determination of the lens positions is also called "learning" and is carried out as a startup process along with other processes (including laser power optimization) during the disc loading process.

The FBAL and BE values that have been obtained for each information layer by carrying out such adjustments or learning (which will be referred to herein as "adjustment results") may be stored either on that optical disc or in a memory in the optical disc drive. However, if the optical discs or the optical disc drives are changed, the adjustments or learning should be carried out all over again. Also, even if the optical disc or the optical disc drive remains the same, fine adjustments should be made to cope with variations with time or temperature. That is why whenever a disc loading process is performed, the focus position and the spherical aberration correction position need to be adjusted for each of multiple information layers of the optical disc. However, if the number of information layers included in a single optical disc exceeded two, then it would take a lot more time to get ready to start reading and writing data as already described for the background art.

The present inventors paid attention to the fact that even if the parameters such as the focus position FBAL and the spherical aberration correction position BE varied with the type of the given optical disc drive or with the operating environment, those parameters still maintained predetermined relation between multiple information layers included in the same optical disc, thus perfecting our invention. More specifically, according to the present invention, correlation information, representing a correlation between a group of parameters about one of multiple information layers (which will be referred to herein as a "first information layer") and another group of parameters about another information layer (which will be referred to herein as a "second information layer"), is obtained, which can eliminate the need for performing the same type of adjustment processing on every information layer in vain.

Hereinafter, the basic principle of the disc loading process to be performed by the optical disc drive of the present invention will be described.

In a preferred embodiment of the present invention, when an optical disc drive is loaded with a multilayer optical disc, the difference between a parameter about a first information layer and a parameter about a second information layer is obtained as correlation information representing the correlation between these two parameters. This difference is also variable depending on the type of the given optical disc or between individual optical discs (which may have mutually different transmission layer thicknesses, for example). Within the same optical disc, however, the difference is kept substantially uniform. That is why if the adjustment of a parameter about the first information layer, for example, can be done and an optimized parameter value (i.e., learning results) can be obtained while the optimization and adjustment (learning) is being carried out during the disc loading process, a parameter value that has been optimized about the second information layer can be obtained by adding the difference to the parameter value that has been optimized about the first information layer. That is to say, as for the second information layer, the parameter adjustment process can be omitted at least partially.

It should be noted that if such a piece of information about the difference is stored on the optical disc or in the optical disc drive, the parameter adjustment process could be omitted as for the second information layer. However, unless the information about the difference is stored there, normal learning would be required about both of the first and second information layers.

Figure 6:
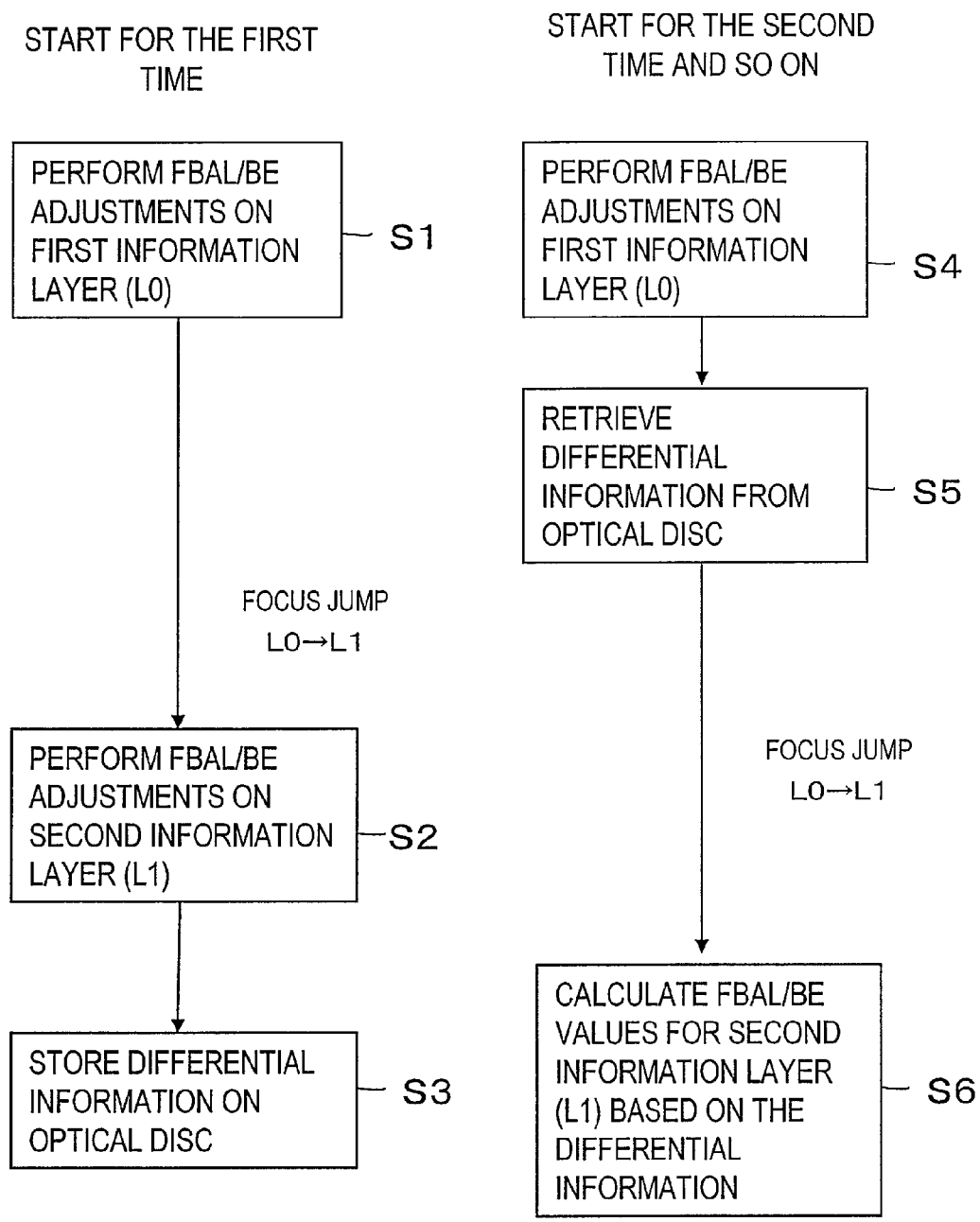
FIG. 6 is a flowchart that outlines how an optical disc drive according to the present invention performs a disc loading process.

Hereinafter, the parameter adjustment procedure according to the present invention will be outlined with reference to FIG. 6, which is a flowchart showing the procedure of adjustment.

First, suppose a situation where the optical disc drive is loaded with an optical disc in which no difference information is stored. After the optical disc drive has been loaded with such an optical disc to start the disc loading process for the first time, FBAL and BE are adjusted on the first information layer (Layer L0) in Step S1. It will be described in detail later how to make this adjustment.

Next, the objective lens is moved in the optical axis direction by the lens actuator in the optical pickup, thereby jumping the focus position of the light beam from the first information layer (Layer L0) to the second information layer (Layer L1) (i.e., making a focus jump operation). Then, the same adjustment as what has been made on the first information layer (Layer L0) is also made on the second information layer (Layer L1), too, in Step S2. Thereafter, the FBAL and BE values that have been obtained for the respective information layers (i.e., layers L0 and L1) through the adjustments are stored in the parameter group storage area of the optical disc in Step S3. The parameter group storage area is provided on the first information layer.

Next, it will be described what processing should be done when the disc loading process is performed on the optical disc for the second time and so on.

First, as has been done during the disc loading process for the first time, the FBAL and BE values are adjusted for the first information layer in Step S4. Thereafter, data is read from the parameter group storage area of the optical disc to obtain information about the difference between the FBAL values of the first and second information layers and information about the difference between the BE values thereof in Step S5. It should be noted that the "information about the difference" could include not only information about the difference itself but also the values of a group of parameters for both of the first and second information layers. This is because the difference can be figured out by subtracting the value of the parameter of the first information layer from that of the parameter of the second information layer.

By adding the differences that have been obtained in Step S5 to the FBAL and BE values for the first information layer that have been obtained in Step S4, FBAL and BE values for the second information layer can be figured out in Step S6.

In this manner, the process of obtaining the FBAL and BE values for the second information layer either by adjustments or learning can be omitted and the disc loading process can be done in a shorter time.

Next, a method for adjusting FBAL and BE values will be described with reference to FIG. 7, of which the abscissa represents the focus position FBAL and the ordinate represents the spherical aberration correction position BE and which shows how the jitter changes with (FBAL, BE). In this graph, the closed curves are contours, each of which is plotted by connecting together the coordinate points (FBAL, BE) where the magnitudes of jitter are equal to each other. The "best position" refers to a coordinate point (FBAL, BE) with the smallest jitter. The more distant from the best position, the greater the magnitude of the jitter represented by the contour. Also, the jitter heavily depends on the converging state of the light beam that has been incident on an information layer. And the closer to the best value FBAL or BE gets, the smaller the jitter gets. That is why if FBAL and BE are changed so as to minimize the jitter, desired FBAL and BE values that would optimize the converging state can be found.

Hereinafter, it will be described how to change FBAL and BE in the adjustment processing step during the disc loading process.

Figure 5:
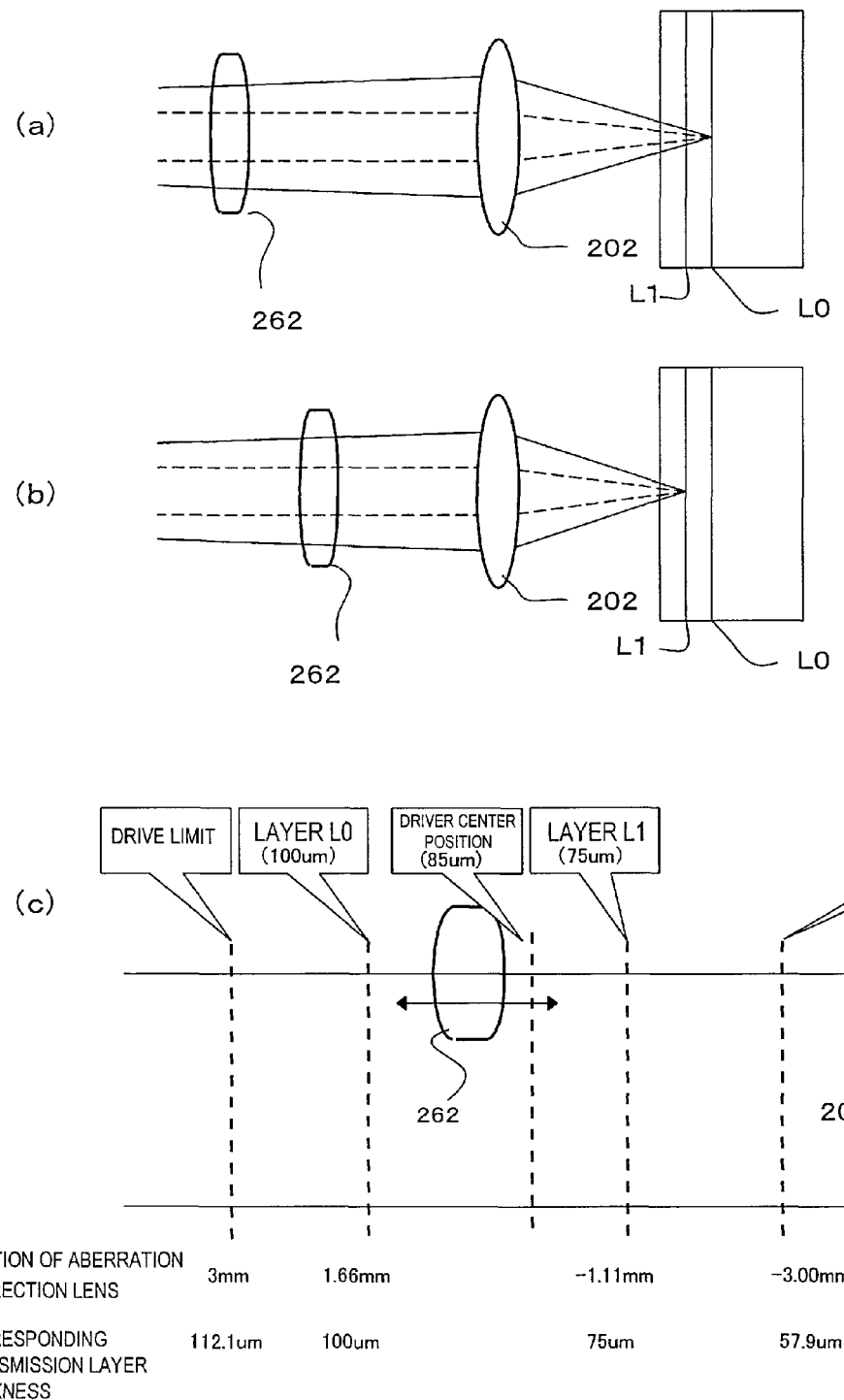
FIGS. 5(a) and 5(b) show the positions of an aberration correction lens 262 that is moved in the optical axis direction to correct aberration and FIG. 5(c) shows how the depth of the information layer, at which the spherical aberration is minimized, changes with the position of the aberration correction lens 262.

First, FBAL and BE are set equal to their initial values. Specifically, the positions of the objective lens 202 and aberration correction lens 262 in the optical axis direction as shown in FIG. 5 are set at their initial positions by a driving section including an actuator. As the initial values, FBAL and BE values that were determined for standard optical discs during the manufacturing process of the optical disc drive may be used. Preferred initial values change from one type of optical discs to another. That is why the type of the given optical disc may be recognized and the initial values may be changed according to the type recognized.

Next, with FBAL fixed at its initial value, the BE values are changed to find a BE value that would maximize the TE amplitude as pointed by the arrow #1. Specifically, with the objective lens 202 shown in FIG. 5 fixed, the aberration correction lens 262 has its positions changed in the optical axis direction. The BE values that would maximize the TE amplitude with respect to a given FBAL value are on the dashed line shown in FIG. 7, and the gradient of the line represented by that dashed line is known in advance. That line passes the center of a "tracking stabilized region" and corresponds to the ridge of the TE amplitude shown in FIG. 7. For that reason, that line will be referred to herein as a "TE ridge line". Also, the processing step as pointed by the arrow #1 will be referred to herein as a "BE coarse adjustment processing step".

Next, both FBAL and BE are changed along that TE ridge line as pointed by the arrow #2. Specifically, the positions of the objective lens 202 and the aberration correction lens 262 shown in FIG. 5 are changed by the same predetermined distance in the optical axis direction. In this case, if FBAL and BE are changed at a rate corresponding to the gradient of the TE ridge line so as to reduce the jitter, the coordinate point (FBAL, BE) defined by the FBAL and BE values can be brought closer to the best position where the jitter becomes the smallest.

Next, the jitters are measured while FBAL values are changed with BE fixed. In this manner, an FBAL value that would substantially minimize the jitter can be obtained as pointed by the arrow #3. Thereafter, the jitters are further measured while BE values are changed with FBAL fixed. In this manner, FBAL and BE values that would minimize the jitter can be obtained as pointed by the arrow #4. This series of processing steps as indicated by the arrows #2, #3 and #4 will be sometimes referred to herein as "FBAL/BE fine adjustment" collectively.

Figure 7:
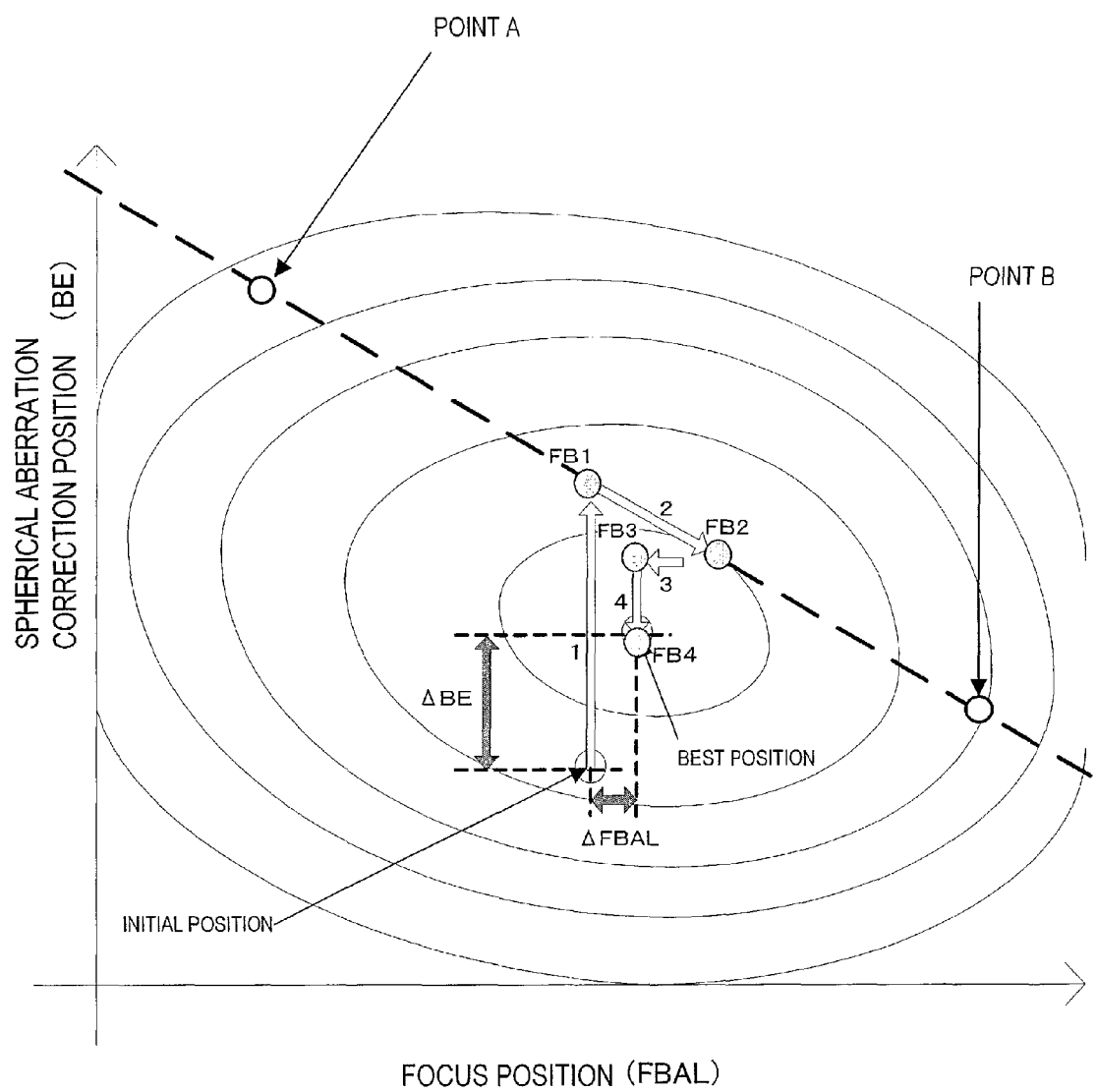
FIG. 7 shows the procedure of optimizing the focus position FBAL and the spherical aberration position BE.
Figure 8:
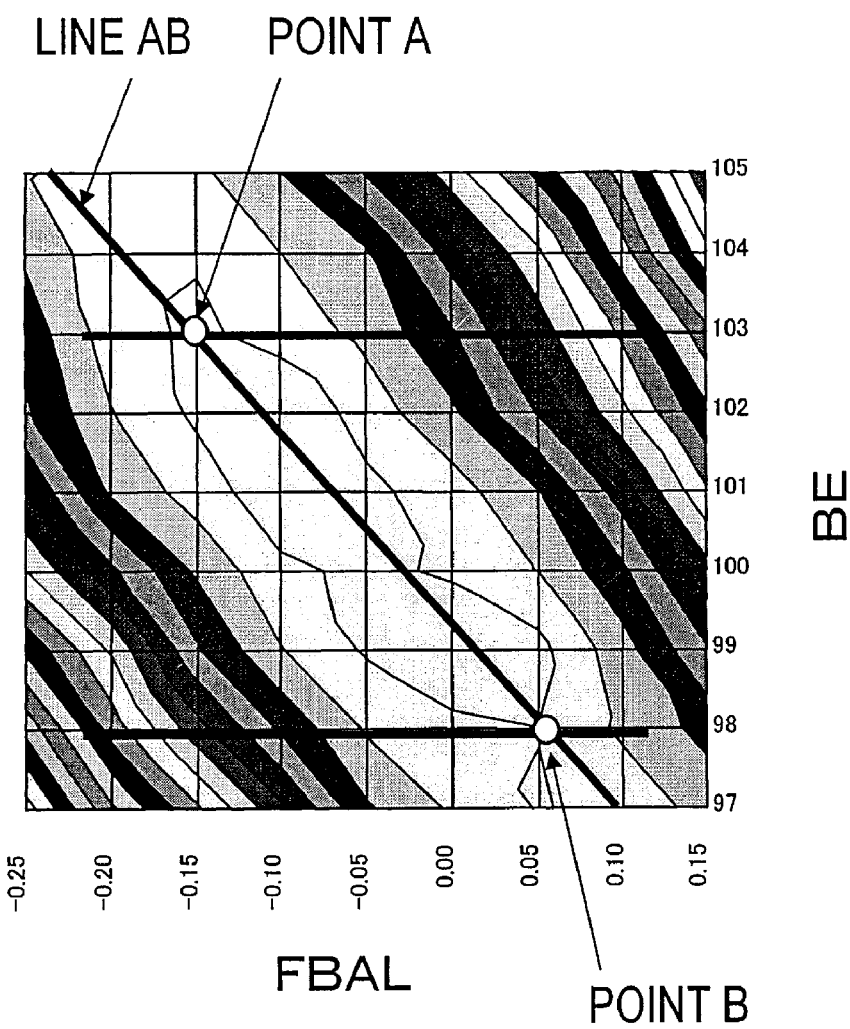
FIG. 8 is a graph showing how the focus position FBAL and the spherical aberration position BE change with the amplitude of a tracking error (TE) signal.

To estimate the gradient of the TE ridge line shown in FIG. 7 accurately, at least two points on the TE ridge line should be determined. FIG. 8 is a graph corresponding to FIG. 7 and shows the contours of the TE amplitudes that were obtained through simulations. The line AB shown in FIG. 8 corresponds to the TE ridge line shown in FIG. 7.

According to an exemplary preferred method for determining the TE ridge line, first, an FBAL value that would maximize the TE amplitude at a relatively small BE setting is obtained. Suppose that in the example shown in FIG. 8, when FBAL values were changed at a BE value of 98, the FBAL value that would maximize the TE amplitude turned out to be 0.05. That is to say, it can be seen that on the line on which BE=98, the TE amplitude became the greatest at the point B. Next, after BE has been increased from 98 to 103, an FBAL value that would maximize the TE amplitude is obtained.

Suppose in the example shown in FIG. 8, an FBAL value that would maximize the TE amplitude turned out to be −0.15. That is to say, it can be seen that on the line on which BE=103, the TE amplitude became the greatest at the point A.

Next, after FBAL has been increased from −0.15 to 0.05, a BE value that would maximize the TE amplitude is obtained. Suppose in the example shown in FIG. 8, a BE value that would maximize the TE amplitude turned out to be 98. That is to say, it can be seen that on the line on which FBAL =0.05, the TE amplitude became the greatest at the point B.

By performing these processing steps, a line that connects the points A and B together may be selected as the TE ridge line. However, it would take approximately 800 ms to get such a series of processing steps done. That is why if this series of processing steps were performed every time the optical disc drive is started, then it would take a longer time to get the disc loading process done. The gradient of the TE ridge line changes from one optical pickup to another, but the dependence of the TE ridge line on the specific type of optical disc is relatively light. Therefore, if the gradient of the TE ridge line is once estimated by the method described above and if that value is stored in a nonvolatile memory (such as an EEPROM) in the optical disc drive, then there will be no need to perform the same series of processing steps to determine the gradient of the TE ridge line when the optical disc drive is started next time. As a result, the effect of shortening the startup time can be achieved.

In the example described above, adjustments are supposed to be made using a TE amplitude or jitter as an index. However, the present invention is in no way limited to such specific preferred embodiments.

Hereinafter, a procedure for adjusting FBAL and BE values according to the present invention will be described in detail with reference to FIG. 9, which is a flowchart showing the detailed procedure of adjustment.

Suppose a situation where the optical disc drive is loaded with an optical disc on which no difference information is stored. After the optical disc drive has been loaded with such an optical disc to start the disc loading process for the first time, BE fine adjustment is carried out on the first information layer (Layer L0) in Step S11, which corresponds to the processing step indicated by the arrow #1 in FIG. 7.

Next, FBAL and BE are changed along the TE ridge line in Step S12, which corresponds to the processing step indicated by the arrow #2 in FIG. 7. Then, after FBAL has been finely adjusted in Step S13, BE is also finely adjusted in Step S14. These processing steps S13 and S14 correspond to those indicated by the arrows #3 and #4, respectively, in FIG. 7.

After the best FBAL and BE values for the first information layer (Layer L0) have been determined (at the best position shown in FIG. 7) in such a procedure, a focus jump is made from the first information layer (Layer L0) to the second information layer (Layer L1). Thereafter, processing steps S15, S16, S17 and S18, which are identical with the processing steps S11, S12, S13 and S14, respectively, are performed, thereby determining the best FBAL and BE values for the second information layer (Layer L1). Then, in Step S19, the difference information about the FBAL and BE values is stored on the optical disc.

Hereinafter, it will be described what processing should be done when the disc loading process is performed on the optical disc for the second time and so on.

First, as has been done during the disc loading process for the first time, the FBAL and BE values are adjusted for the first information layer in Steps S20, S21, S22 and S23. Thereafter, differential information is retrieved from the optical disc in Step S24.

By adding the differences that have been obtained in Step S24 to the FBAL and BE values for the first information layer (Layer L0), FBAL and BE values for the second information layer (Layer L1) can be figured out.

The FBAL and BE values that have been figured out in this manner for the second information layer (Layer L1) may have slightly shifted from FBAL and BE values that would have been obtained by actually making adjustments. Such a shift may have been caused because there could be a difference in environmental temperature (or the temperature of the laser light source) between the first disc loading process and the current disc loading process. To compensate for such a shift, additional fine adjustments are preferably made on the FBAL and BE values by using FBAL and BE values, which have been obtained by adding the difference, as initial values. That is why in this example, fine adjustment is made on FBAL in Step S25 and then on BE in Step S26, respectively. However, such adjustments are not indispensable. Alternatively, the environmental temperature may be detected and then the FBAL and BE values calculated may be corrected according to that environmental temperature.

Figure 9:
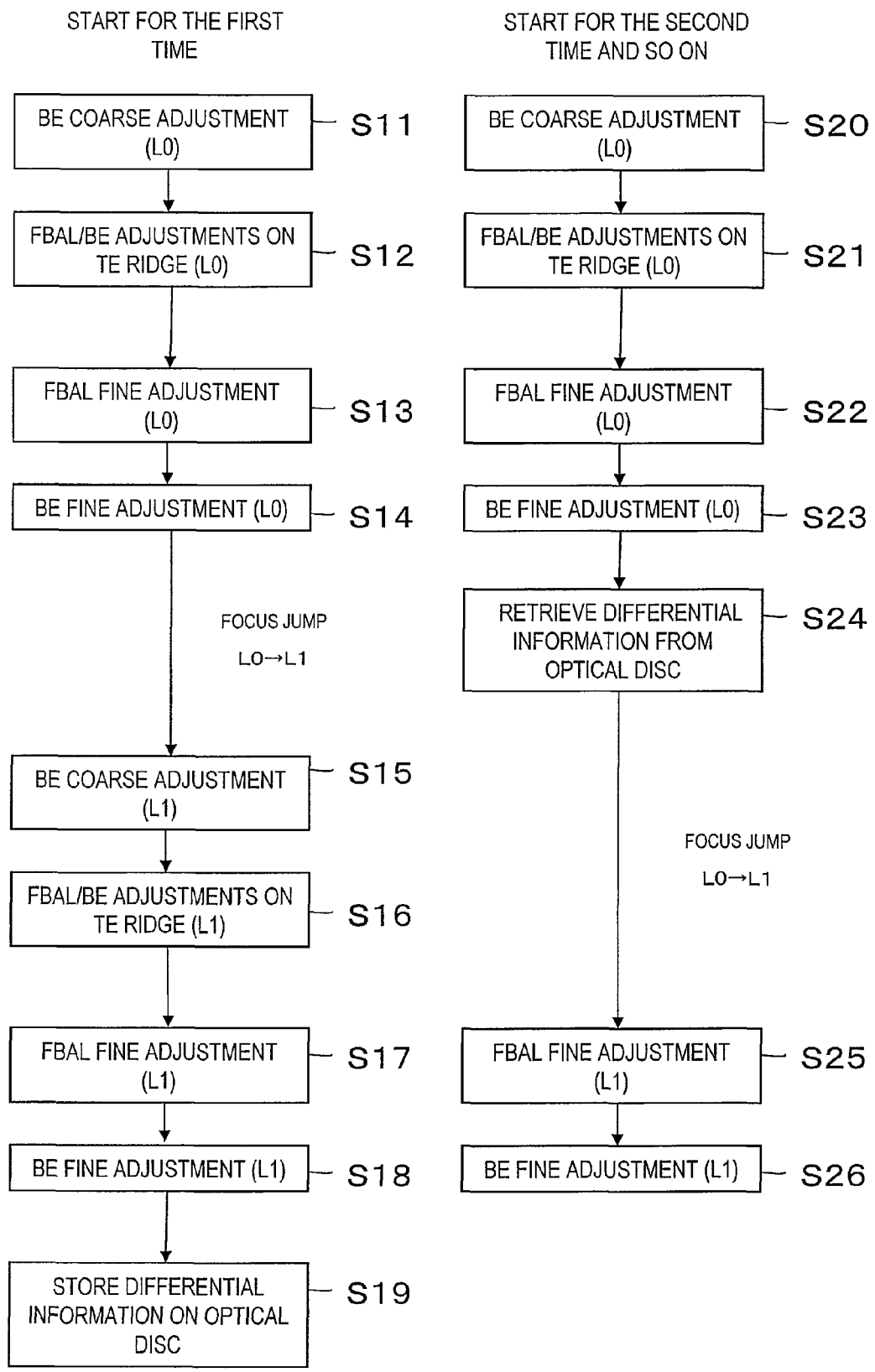
FIG. 9 is a flowchart showing a detailed procedure of a disc loading process performed by an optical disc drive according to the present invention.

According to the procedure shown in FIG. 9, the time it takes to get the disc loading process done for the second time can be shortened by the amount of time for performing the processing steps S15 and S16 (approximately one second in total).

In the example described above, a single optical disc has two information layers. However, the greater the number of information layers in a single optical disc, the more significant the effect of shortening the disc loading process time to be achieved by the present invention.

Hereinafter, specific preferred embodiments of the present invention will be described in further detail.

Embodiment 1

A first specific preferred embodiment of the present invention will be described.

First, the structure of an optical disc for use in this preferred embodiment will be described with reference to FIG. 10. This structure is compliant with the Blu-ray Disc Rewritable Format, and therefore, an optical disc compliant with this format will be referred to herein as a "BD-RE disc".

Figure 10:
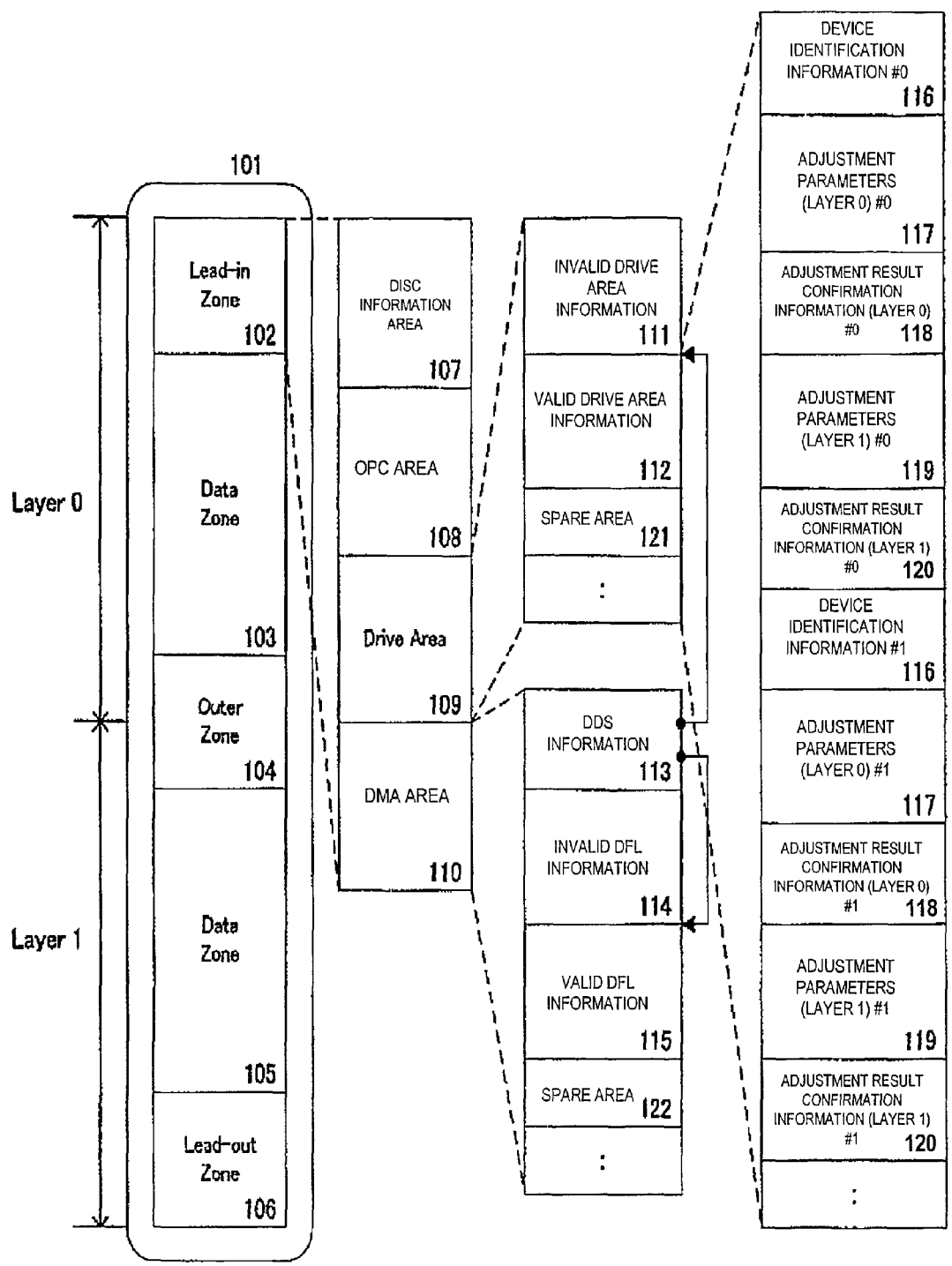
FIG. 10 schematically shows the format of an optical disc according to a preferred embodiment of the present invention.

On a BD-RE disc 101, the physical addresses shown in FIG. 10 increase downward on the paper. In FIG. 10, the area identified by "Layer 0" is the first information layer (Layer L0), and the area identified by "Layer 1" is the second information layer (Layer L1). The layers L0 and L1 are actually physically discontinuous from each other but are shown as continuous with each other in FIG. 10.

Lead-in Zone 102 is a zone for storing disc information and information for use in adjustments as will be described in detail later.

Data Zone 103 is a zone of the Layer L0 on which user data should be written. Outer Zone 104 is a zone to store DMA information and Control Data information. Data Zone 105 is a zone of the Layer L1 on which user data should be written. Lead-out Zone 106 is a zone to store DMA information and Control Data information.

The Lead-in Zone 102 will be described in detail. The Lead-in Zone 102 consists of a disc information area 107, an OPC area 108, a Drive Area 109 and a DMA area 110.

The disc information area 107 is an area on which the type of the disc, the number of information layers, the storage capacity, linear velocity and other recording parameters recommended by the manufacturer of the disc, and other pieces of information are stored. The OPC area 108 is a tentative write area for use to adjust the power of the light beam, for example.

The Drive Area 109 is an area that can be used arbitrarily by the individual manufacturer of the drive, and includes an area in which invalid Drive Area information 111 is stored, an area in which valid Drive Area information 112 is stored, and a spare area 121. The valid Drive Area information 112 includes a device identification area and drive's own information area that can be used in an arbitrary format. It will be described in detail later how to use this Drive Area 109.

The DMA area 110 is an area in which the disc's defect management information and other pieces of information are stored. The DMA area 110 includes DDS information 113 in which the address information of a valid defect management list and that of a valid Drive Area information are stored, valid DFL information 115 in which a defect management list including the status of each defect location and an alternative address has been written, invalid DFL information 114 and a spare area 122.

The valid Drive Area information 112 includes at least one set of device identification information 116, Layer L0 adjustment parameters 117, Layer L0 adjustment result confirmation information 118, Layer L1 adjustment parameters 119, and Layer L1 adjustment result confirmation information 120. The device identification information 116 includes information unique to the device that has performed a write operation on the BD-RE Disc 101. The Layer L0 adjustment parameters 117 and the Layer L1 adjustment parameters 119 include the best adjustment results that have been obtained for associated information layers during the previous disc loading process. The L0 and Layer L1 adjustment result confirmation information 118 and 120 includes information for use to determine whether or not the values of the adjustment parameters 117 and 119 may be used. In FIG. 10, the numeral that follows # is an index number given to each device.

On the BD-RE Disc 101 shown in FIG. 10, write operations were performed by two optical disc drives. Since the address information of the valid Drive Area information 112 is stored in the DDS information 113, the information stored in the Drive Area 109 is not available until the DDS information is read.

Next, the adjustment parameters 117 and the adjustment result confirmation information 118 will be described in detail with reference to FIG. 11, which shows a format for the adjustment parameters 117 and adjustment result confirmation information 118 according to this preferred embodiment.

The adjustment parameters 117 include an FBAL value 303 and a spherical aberration correction position 304, which are results obtained by making an FBAL/BE fine adjustment on the Layer L0, and an FBAL value 305 and a spherical aberration correction position 306, which are results obtained by making an FBAL/BE fine adjustment on the Layer L1.

The adjustment result confirmation information 118 is a piece of information to be used to determine whether or not information of the adjustment parameters 117 has valid values. This information includes the temperature 307 when the FBAL/BE fine adjustment is made on the Layer L0 and the temperature 308 when the FBAL/BE fine adjustment is made on the Layer L1. Optionally, the adjustment result confirmation information 118 may include other pieces of information, not just the information about temperatures. Specifically, examples of other pieces of information include a signal index during adjustments (such as a bottom jitter), the address of an adjustment area, a parameter indicating a state of the device during the adjustments (such as the value of a cam's vibration sensor), the rotational frequency of the disc during the adjustments, and a time stamp during the adjustments.

If such an optical disc that stores the adjustment parameters 117 and the adjustment result confirmation information 118 is used, the adjustment parameters 117 and the adjustment result confirmation information 118 can be retrieved from the Drive Area 109 shown in FIG. 10 by making adjustments on the Layer L0 first during the disc loading process. As a result, the adjustments can be done on the Layer L1 in a shorter time.

The foregoing description has been provided about a BD-RE with two information layers. However, the number of information layers that a single optical disc has may be arbitrarily defined and may be greater than two. Also, the optical disc may be any non-BD-RE optical disc with an area to store drive's own information.

Figure 12:
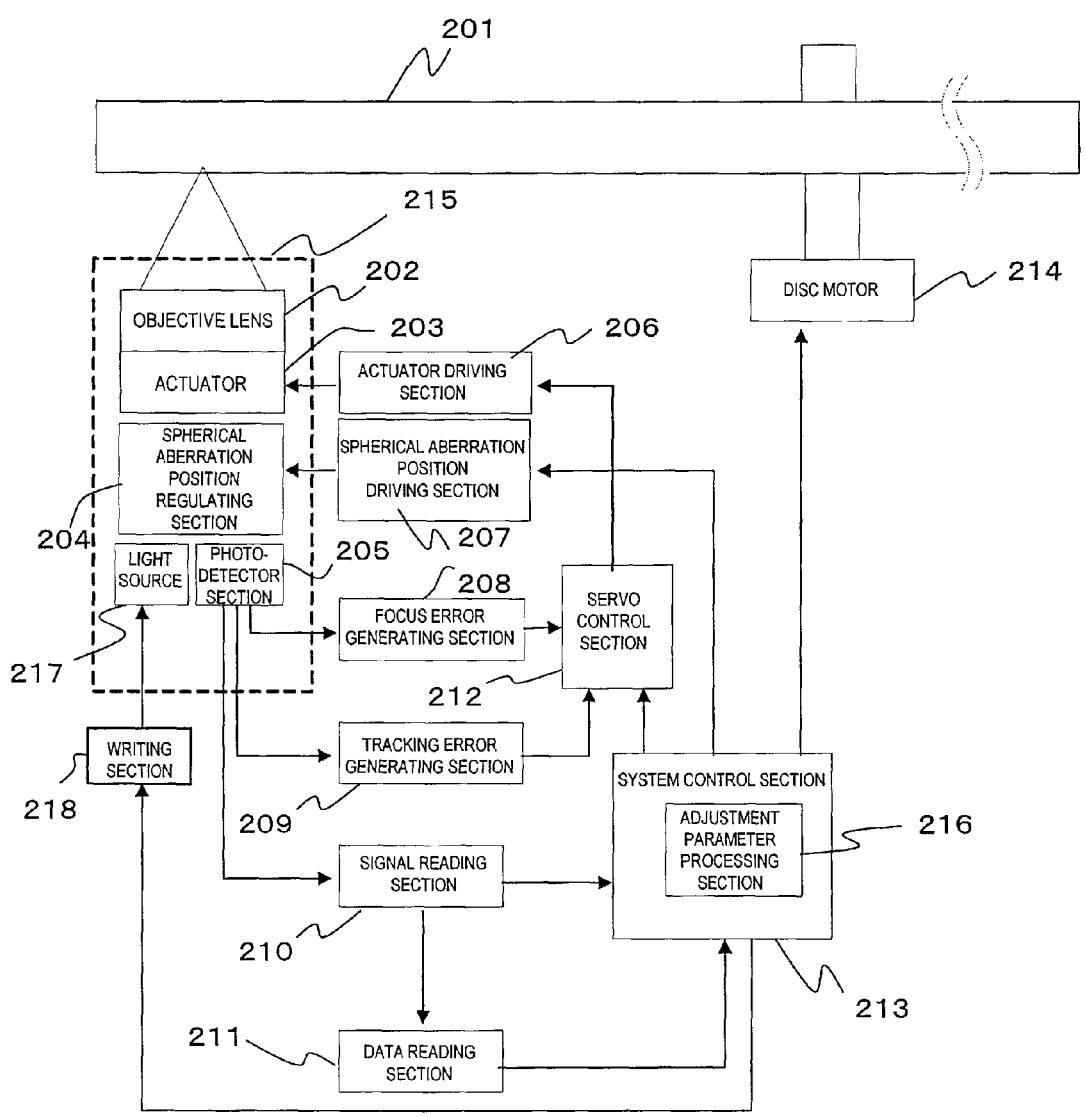
FIG. 12 is a block diagram showing a configuration for an optical disc drive according to a first preferred embodiment of the present invention.

Next, an optical disc drive for reading and writing data from/on a BD-RE disc with such a structure will be described with reference to FIG. 12, which is a block diagram showing a configuration for an optical disc drive 200 according to this preferred embodiment.

The optical disc drive 200 of this preferred embodiment includes a disc motor 214 for rotating the optical disc 201 loaded, an optical pickup 215 for accessing the optical disc 201 optically, and circuitry for exchanging signals with the optical pickup 215.

The optical pickup 215 may have a known configuration and includes a laser light source 217, an objective lens 202 for converging the light beam, emitted from the laser light source 217, on the optical disc 201, and a photodetector section 205 that receives the light beam reflected from the optical disc 201 and converts it into various types of electrical signals. Between the objective lens 202 and the photodetector section 205, arranged is a spherical aberration position regulating section 204, which is a device including an aberration correction lens (see FIG. 5) that is movable in the optical axis direction and which can reduce the aberration of the light beam at an information layer of the optical disc 201 by regulating the converging and diverging state of the light beam. Also provided inside the optical pickup 201 is a temperature sensor (not shown) for detecting the temperature of the laser light source 217.

One of the output electrical signals of the photodetector section 205 is supplied to a focus error generating section 208, which generates a focus error signal (FE signal) in response. The other output electrical signals of the photodetector section 205 are supplied to a tracking error generating section 209 and a signal reading section 210, which generate a tracking error signal (TE signal) and a read signal (RF signal), respectively. The RF signal is supplied to a data reading section 211, which decodes the information that has been written on the optical disc 201 based on the RF signal and sends the decoded information to a system control section 213. Based on the signals supplied from the signal reading section 210 and the data reading section 211, the system control section 213 reads the user data and calculates the value of a signal quality index such as jitter.

The FE signal may be generated by a focus error detection method, which is generally called an "astigmatism method". On the other hand, the TE signal may be generated by a tracking error detection method, which is generally called a "push-pull method". The FE and TE signals are supplied to a servo control section 212, which performs a focus servo control to keep the relative distance between the objective lens 202 and the storage plane of the optical disc 201 constant and a tracking servo control to make the laser beam spot follow the track on the optical disc 201. The servo control section 212 supplies a control signal to an actuator driving section 206, which supplies a drive signal to an objective lens actuator 203 provided for the optical pickup 202, thereby driving the objective lens actuator 203. That is to say, using those error signals, the servo control section 212 activates the objective lens actuator 203 and drives the objective lens 202, thereby forming servo loops of focus and servo controls and performing the servo controls.

The spherical aberration position regulating section 204 changes the magnitudes of aberration corrections in accordance with a drive signal supplied from a spherical aberration position driving section 207, thereby performing a spherical aberration correction.

The system control section 213 generates a focus disturbance signal, which would cause a fluctuation in the focus position of the objective lens 202, and supplies it to the servo control section 212. In response to this focus disturbance signal, the servo control section 212 and the actuator driving section 206 cause a fluctuation in the focus position of the objective lens 202. Also, the system control section 213 instructs the disc motor 214 to start or stop rotating and sets the rotational frequency, thereby controlling the rotation of the disc motor 214. The adjustment parameter processing section 216 interprets the results of adjustments on the Layer L0 and the adjustment parameters 117 and the adjustment result confirmation information 118 shown in FIG. 11, thereby performing adjustment processing on the Layer L1.

In this preferred embodiment, the adjustment parameter processing section 216 is included in the system control section 213. Alternatively, the adjustment parameter processing section 216 may be included in the servo control section 212 or may even be an independent component. Still alternatively, the adjustment parameter processing section 216 may be implemented as a part of a control program that constitutes the system control section 213 and the servo control section 212.

If the optical disc 201 is a recordable optical disc, the writing section 218 writes data on the optical disc 201 by driving the laser light source 217 and making the laser light source 217 emit a light beam, of which the intensity has been modulated according to the data to be written. The operation of the writing section 218 is controlled by the system control section 213. The parameter values such as FBAL, BE and adjustment temperature that have been obtained by making adjustments during the disc loading process are also written in a predetermined area on the optical disc 201 by making the writing section 218 drive the laser light source 217.

Figure 13:
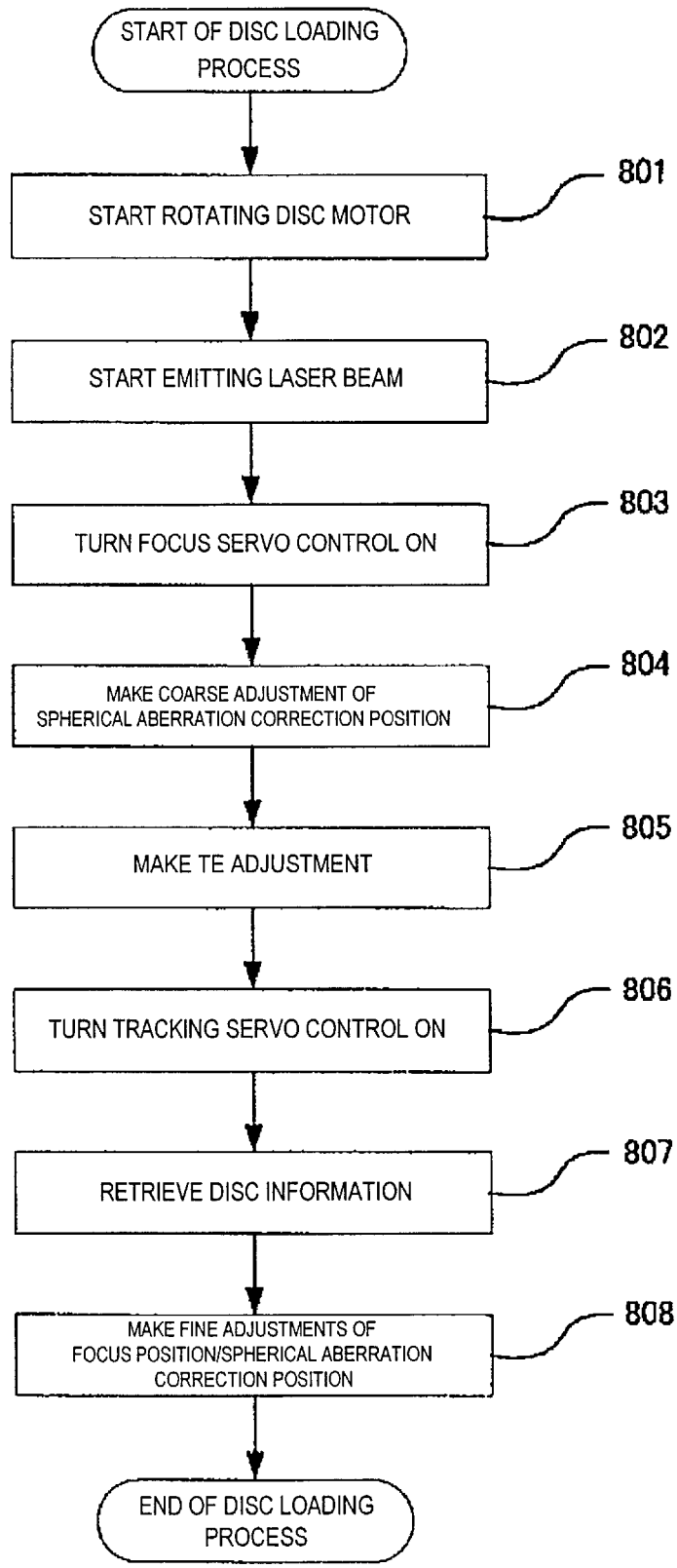
FIG. 13 is a flowchart showing the procedure of a disc loading process according to the first preferred embodiment.

Hereinafter, the procedure of a disc loading process on an optical disc will be outlined with reference to FIG. 13, which is a flowchart showing the procedure of a disc loading process to be performed on the optical disc 201 using the optical disc drive 200 described above.

First, in Step 801, the system control section 213 sets a rotational frequency for the disc motor 214 and instructs the disc motor 214 to start rotating. Next, in Step 802, the laser light source 217 starts to irradiate the optical disc 201 with a laser beam. Then, in Step 803, the servo control section 212 turns a focus servo control ON. Thereafter, in Step 804, the spherical aberration position regulating section 204 shown in FIG. 12 regulates the spherical aberration correction position to a position where the servo control gets stabilized. This regulation is a coarse adjustment of the spherical aberration correction position (BE) as indicated by the arrow #1 in FIG. 7 and will be described in further detail later. Subsequently, in Step 805, the TE signal is controlled so as to optimize the amplitude and balance of the TE signal. Then, in Step 806, the tracking servo control is turned ON.

Next, in Step 807, the disc information stored on the optical disc 201 is retrieved. Examples of the disc information include the type of the disc and parameters that are recommended by the manufacturer of the disc for use in performing read/write operations on the disc. Finally, in Step 808, the lens actuator 203 adjusts the focus position and the spherical aberration position regulating section 204 regulates the spherical aberration correction position. These adjustments and regulations are fine adjustments to be done to optimize the converging state of the light beam at the information layer in order to read data. These fine adjustments are indicated by the arrows #2 through #4 in FIG. 7 and will be described in further detail later.

Hereinafter, it will be described in further detail exactly how the optical disc drive 200 performs the disc loading process on the BD-RE disc 101. First, look at FIG. 14, which is a flowchart showing the procedure in which the optical disc drive 200 performs the disc loading process on the BD-RE disc 101. In the following example, however, the BD-RE disc 101 is supposed to have never been subjected to the disc loading process by the optical disc drive 200. That is to say, the adjustment parameters 117 and adjustment result confirmation information 118 that are associated with the device identification information of the optical disc drive 200 are not stored on the BD-RE disc 101 in the following example.

First, in Step 1201, a BE coarse adjustment is made on the Layer L0 as indicated by the arrow #1 in FIG. 7. The BE coarse adjustment is an adjustment for finding a BE value that would maximize the TE amplitude. Hereinafter, the procedure of the BE coarse adjustment will be described in detail with reference to FIG. 15.

Figure 15:
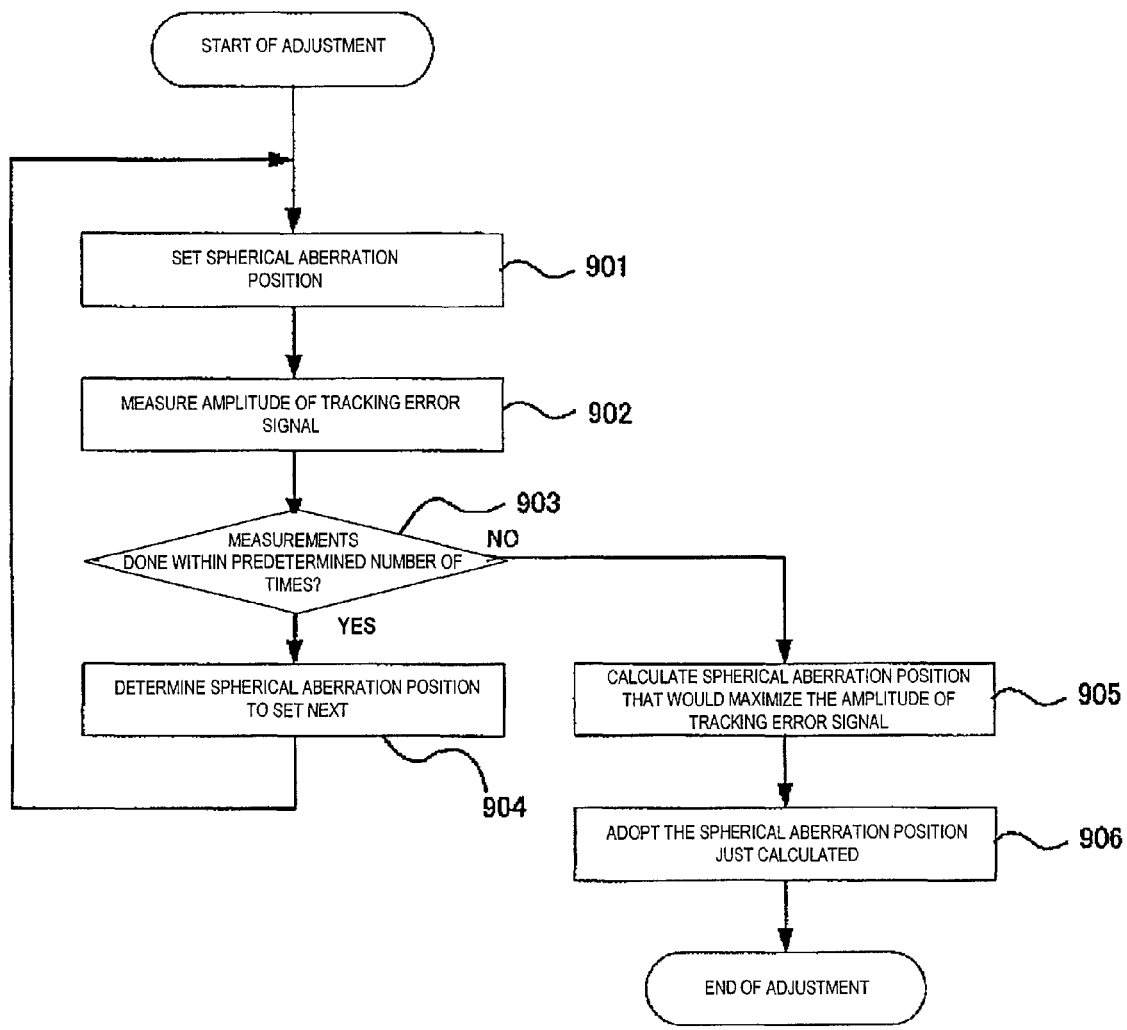
FIG. 15 is a flowchart showing the procedure of a spherical aberration correction position (BE) coarse adjustment.

First, in Step 901 shown in FIG. 15, the initial value of BE is set. The initial value is a fixed value that may have been determined during the designing process so as to optimize the BE with respect to an optical disc with a transmission layer thickness of 100 µm, for example.

Next, in Step 902, the TE amplitude is measured. Then, in Step 903, it is determined whether or not the number of times of measurements that have been done in the previous processing step 902 is within a predetermined number. If the answer is YES, the process advances to Step 904 to make measurements repeatedly. On the other hand, if the number of times has already exceeded the predetermined number, then the process advances to Step 905. The predetermined number of times may be set based on the amplitude of a BE value that can maintain a focus controlled state by searching for a point where the TE amplitude becomes maximum.

In Step 904, a BE value to adopt next time is determined. The BE value to be set for the first time may be a value that has been changed by a predetermined magnitude in a fixed direction. When the BE value is set for the second time and so on, the TE amplitudes at both ends of BE are compared to each other and a value that has been changed by a predetermined magnitude in the direction with the greater TE amplitude is adopted. Once the setting to adopt has been determined, the BE is set to that value in Step 901 and then the same series of processing steps 901 through 904 are performed all over again.

In Step 905, a BE value that would maximize the TE amplitude is calculated based on the TE amplitude measured and the BE setting at that point in time. The BE value that would maximize the measured TE amplitude may be adopted as a result of calculation as it is. Alternatively, a second order approximation may be performed based on the relation between the TE amplitude and the BE value and then a BE value that would maximize the TE amplitude may be calculated.

Finally, in Step 906, the BE value is determined to be the one that has just been calculated in previous processing step 905.

By making the adjustments in such a procedure, the coarse adjustment indicated by the arrow #1 in FIG. 7 can be done and a BE value that would maximize the TE amplitude can be obtained.

Now look at FIG. 14 again. In Step 1202 shown in FIG. 14, results of the BE coarse adjustments on the Layer L0 are obtained. Examples of the adjustment results include an adjustment result BE value and temperature information during the adjustments. These results obtained are stored in a memory (not shown) included in the system control section 213.

Next, in Step 1203, FBAL/BE fine adjustments are made on the Layer L0. According to this preferred embodiment, the FBAL/BE fine adjustments are done in order to find a focus position and a BE that would minimize the jitter by measuring the jitter in the recorded areas while changing the settings of the focus positions and BE. The best focus position and BE to read data will be described first.

Figure 16:
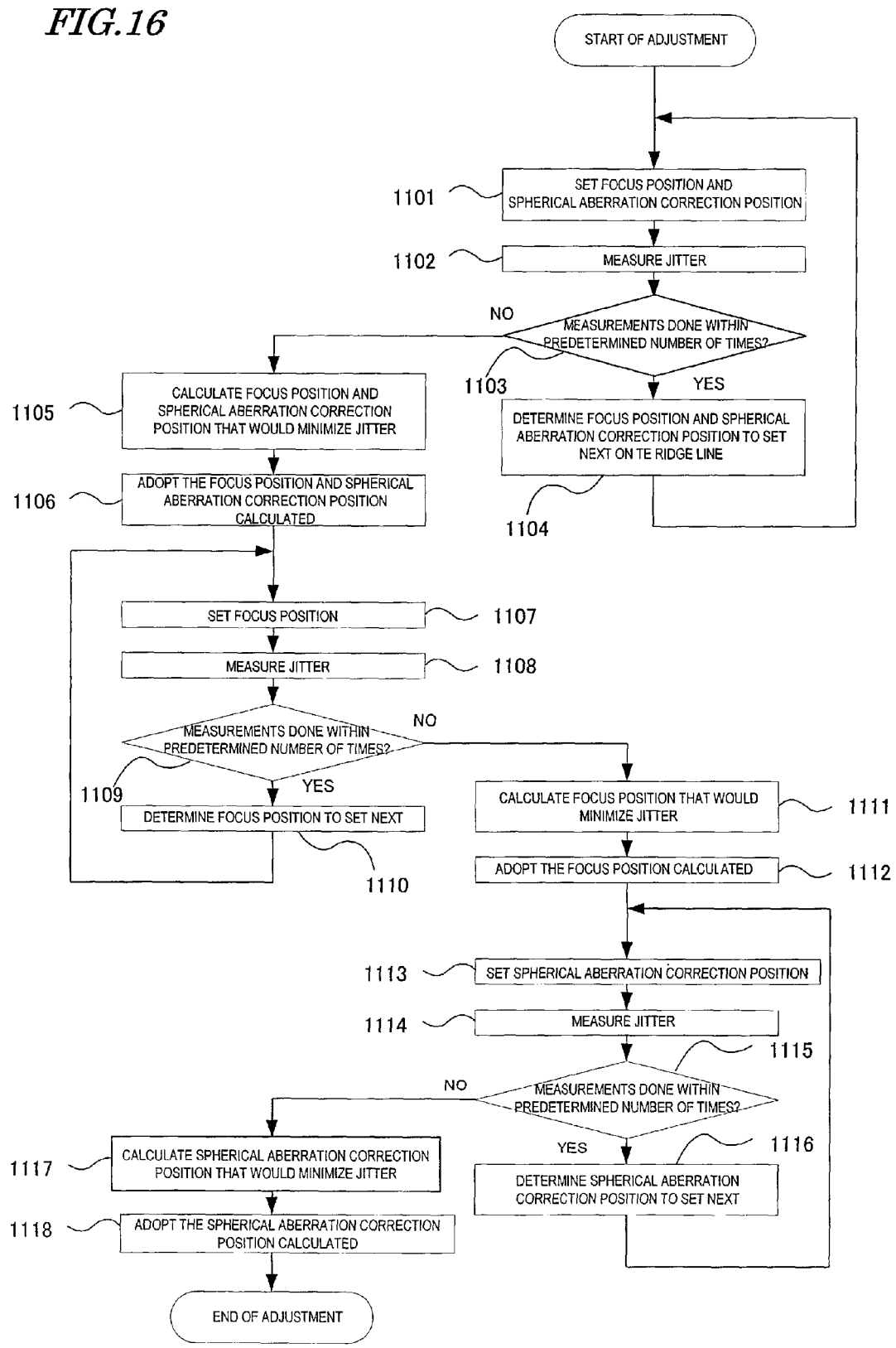
FIG. 16 is a flowchart showing the procedure of focus position (FBAL)/spherical aberration correction position (BE) fine adjustments.

Hereinafter, the procedure of the FBAL/BE fine adjustments (as indicated by the arrows #2 to #4 in FIG. 7) will be described with reference to FIG. 16.

First, in Step 1101, a focus position and a spherical aberration correction position are set. As the initial values of the focus position and spherical aberration correction position to be set, a fixed value such as zero or a value obtained by making adjustments during the manufacturing process is normally used. However, if the FB1 point shown in FIG. 7 (i.e., a point on the TE ridge line) has been obtained as a result of the BE coarse adjustments, FBAL and BE values corresponding to that FB1 point are used as the initial values.

Next, in Step 1102, the jitter in a recorded area for use in adjustments is measured. The recorded area needs to be secured in advance by searching the areas that are known to have been recorded before this flowchart is carried out. On the other hand, if there are no such areas that are known to have been recorded, an area on which a tentative write operation will be performed for the purpose of adjustments may be defined as the recorded area.

Subsequently, in Step 1103, it is determined whether or not the number of times of jitter measurements that have been performed in the previous processing step 1102 is within a predetermined number. If the answer is YES, the process advances to Step 1104 to make measurements repeatedly. On the other hand, if the predetermined number has been exceeded, the process advances to Step 1105.

In Step 1104, a focus position and a spherical aberration correction position to be set next time are determined. The focus position and spherical aberration correction position to be set next time should be located by changing both the focus position and the spherical aberration correction position at a rate that is defined by the gradient of the TE ridge line shown in FIG. 7. In other words, the magnitude of shift is determined such that the shifted point is located on the TE ridge line shown in FIG. 7.

By repeatedly performing this series of processing steps 1101 through 1104 a predetermined number of times, the focus position and spherical aberration correction position will shift on the TE ridge line shown in FIG. 7. Thereafter, in Step 1105, a focus position and a spherical aberration correction position that would minimize the jitter are calculated based on a combination of the jitter measured and the focus position and spherical aberration correction position at that point in time. The focus position at which the jitter measured becomes the smallest may be adopted as a result of calculation as it is. Alternatively, a second order approximation may be performed based on the relation between the jitter and the focus position and spherical aberration correction position and then a focus position that would minimize the jitter may be calculated.

In this manner, a fine adjustment to the FB2 point as indicated by the arrow #2 in FIG. 7 can be done.

Next, in Step 1106, the focus position and spherical aberration correction position are determined to be the ones that have just been calculated in previous processing step and fine adjustment of the focus position is started. That is to say, the focus position is set in Step 1107. The initial value may be the focus position that has been calculated in Step 1106.

Thereafter, in Step 1108, the jitter in a recorded area for use in adjustments is measured. Subsequently, in Step 1109, it is determined whether or not the number of times of jitter measurements that have been performed in the previous processing step 1108 is within a predetermined number. If the answer is YES, the process advances to Step 1110 to make measurements repeatedly. On the other hand, if the predetermined number has been exceeded, the process advances to Step 1111.

In Step 1110, a focus position to adopt next time is determined. The focus position to be set for the first time may be a value that has been changed by a predetermined magnitude in a fixed direction. When the focus position is set for the second time and so on, jitters at two different focus positions are compared to each other and a value that has been changed by a predetermined magnitude in the direction with the smaller jitter is adopted. Once the setting to adopt has been determined, the focus position is set to that value in Step 1107 and then the same series of processing steps 1107 through 1110 are performed all over again. It should be noted that the focus position has a settable range. That is why the adjustments are made by increasing or decreasing either the fixed value or the predetermined number of times that has been adopted to make a decision in Step 1110 according to that settable range.

By repeatedly performing this series of processing steps 1107 through 1110, the fine adjustment as indicated by the arrow #3 in FIG. 7 advances. Meanwhile, in Step 1111, based on the jitters that have been measured by repeatedly performing the series of processing steps 1107 through 1110 a predetermined number of times, a focus position that would minimize the jitter (i.e., a focus position corresponding to the FB3 point in FIG. 7) is calculated. Then, with the focus position determined to be the one that has just been calculated, a series of processing steps 1113 through 1116 are repeatedly performed. This series of processing steps 1113 through 1116 is the same as the previous series of processing steps 1107 through 1110 except that the value to be set is a spherical aberration correction position BE instead of the focus position FBAL. By repeatedly performing this series of processing steps 1113 through 1116, the fine adjustment as indicated by the arrow #4 in FIG. 7 advances. If it has been determined in Step 1115 that the predetermined number has been exceeded, the process advances to Step 1117, in which based on the jitters that have been measured by repeatedly performing the series of processing steps 1113 through 1116 a predetermined number of times, a spherical aberration correction position that would minimize the jitter (i.e., a focus position corresponding to the FB4 point in FIG. 7) is calculated. Then, in Step 1118, the focus position is determined to be the one that has just been calculated (i.e., the FB4 point shown in FIG. 7) to end the disc loading process.

By making these adjustments, the focus position and BE that would minimize the jitter (i.e., the best point shown in FIG. 7) can be obtained.

Look at FIG. 14 again. In Step 1204, results of the FBAL/BE fine adjustments on the Layer L0 are obtained. The results of adjustments obtained include an adjustment result FBAL value, an adjustment result BE value, information about the temperature during the adjustment, address information about the area on which the adjustment has been made and a jitter value under the adjustment result condition. These results obtained may be stored in a memory (not shown) included in the system control section 213, for example.

Next, in Step 1205, read processing is performed on the DMA area 110 on the BD-RE disc 101.

Subsequently, in Step 1206, address information representing the top of the valid Drive Area information 112 is extracted from the DDS information in the DMA information that has been obtained in the previous processing step 1205.

Then, in Step 1207, the Drive Area information 112 is read out from the location specified by the address information that has been extracted in the previous processing step 1206. As for the BD-RE disc 101, in the area in which the Drive Area information 112 is stored, mutually different pieces of Drive Area information 112 may be stored for 32 different types of optical disc drives. Those pieces of identification information to identify the respective optical disc drives are stored in the area for the device identification information shown in FIG. 10. From the Drive Area information 112 that has been read out from the BD-RE disc 101, a piece of information about the optical disc drives made by his or her manufacturer is selectively extracted. That is to say, the adjustment parameters 117 and adjustment result confirmation information 118 that are stored on the BD-RE disc 101 are retrieved.

Next, in Step 1208, a focus jump operation toward the Layer L1 is performed.

Subsequently, in Step 1209, a BE coarse adjustment is made on the Layer L1. The BE coarse adjustment is carried out by the method that has already been described with reference to FIG. 15.

Thereafter, in Step 1210, results of the BE coarse adjustments on the Layer L1 are obtained. Examples of the adjustment results include an adjustment result BE value and temperature information during the adjustments. These results obtained are stored in a memory (not shown) included in the system control section 713.

Next, in Step 1211, FBAL/BE fine adjustments are made on the Layer L1. The FBAL/BE fine adjustments are carried out by the method that has already been described with reference to FIG. 16.

Thereafter, in Step 1212, results of the FBAL/BE fine adjustments on the Layer L1 are obtained. The results of adjustments obtained include an adjustment result FBAL value, an adjustment result BE value, information about the temperature during the adjustments, address information about the area on which the adjustments have been made and a jitter value under the adjustment result condition. These results obtained may be stored in a memory (not shown) included in the system control section 713, for example.

Next, in Step 1213, a focus jump operation toward the Layer L0 is performed.

Finally, in Step 1214, the results of adjustments that have been obtained in Steps 1202, 1204, 1210 and 1212 are stored at the location where the Drive Area information acquired in Step 1206 is stored. As shown in FIG. 10, the Drive Area information is stored in a predetermined area on the Layer L0 of the optical disc. The Drive Area information is written after having been classified by the adjustment parameter processing section 216 into the adjustment parameters 117 and the adjustment result confirmation information 118 following the format shown in FIG. 11.

It should be noted that to "acquire" the results of adjustments in Steps 1202, 1204, 1210 and 1212 means determining the values of the adjustment parameters 117 (see FIGS. 10 and 11) by actually making adjustments. Also, the values of the adjustment parameters 117 to be stored in the Drive Area are not limited to the results of adjustments that were made during the disc loading process but may also be the results of adjustments that have been carried out after the disc loading process.

Figure 14:
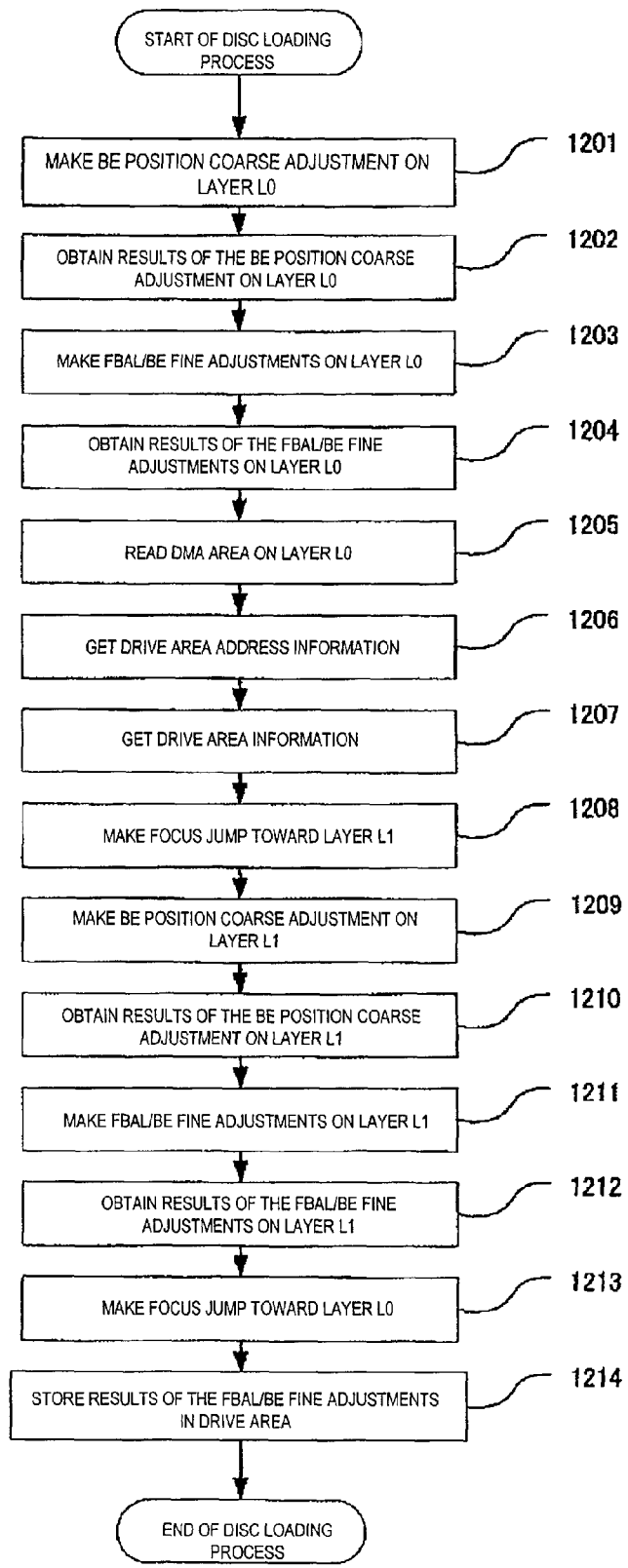
FIG. 14 is a flowchart showing the procedure of performing a disc loading process on an optical disc in which no valid Drive Area information 112 is stored in the first preferred embodiment.

Hereinafter, the procedure of performing a disc loading process on the BD-RE disc 101 on which the Drive Area information 112 has been written in the procedure shown in FIG. 14 will be described with reference to FIG. 17A.

Figure 17A:
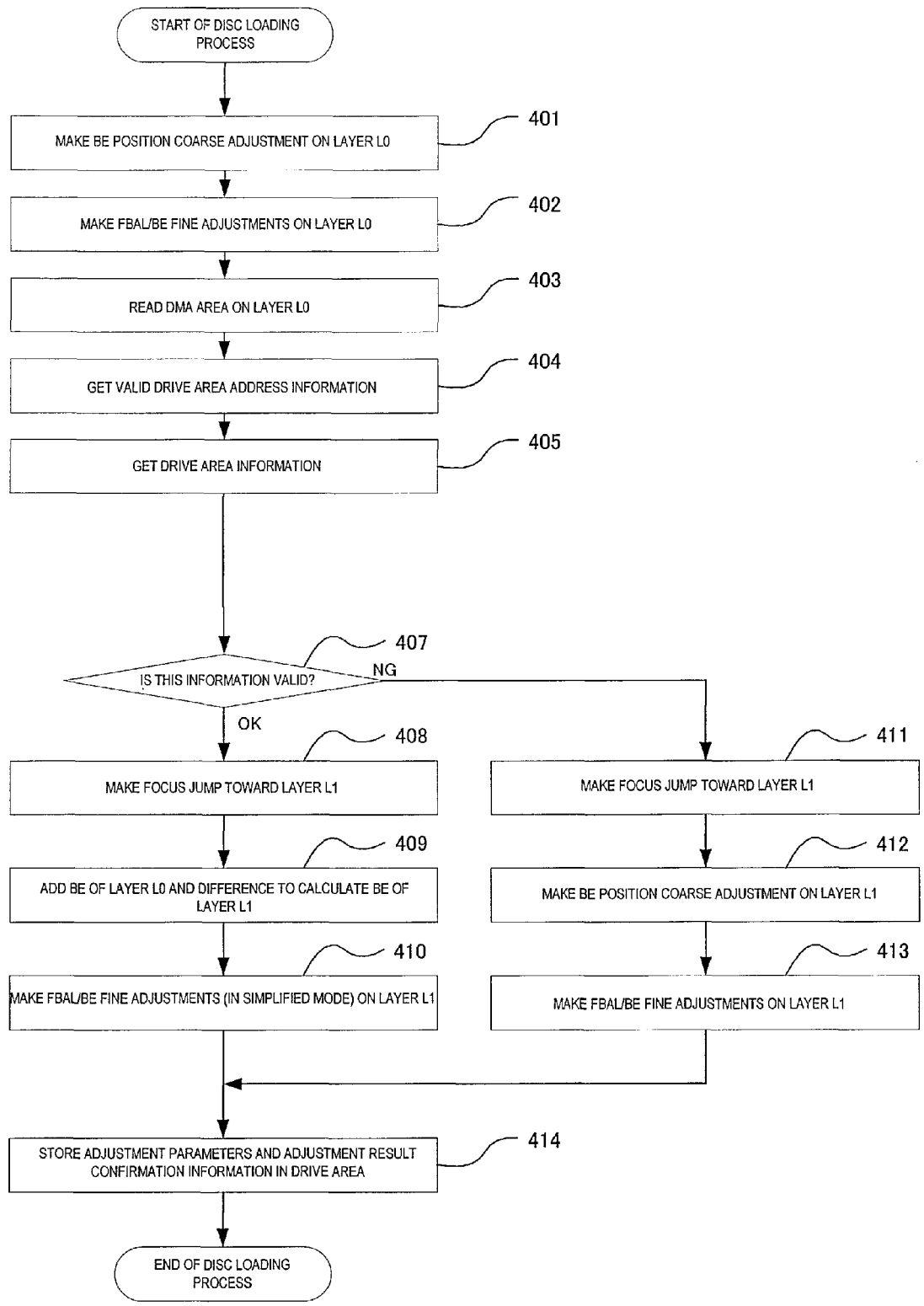
FIG. 17A is a flowchart showing the procedure of performing a disc loading process on an optical disc on which valid Drive Area information 112 is stored according to the first preferred embodiment.

FIG. 17A is a flowchart showing a procedure in which the optical disc drive 200 performs a disc loading process on the BD-RE disc 101. In the following example, however, the BD-RE disc 101 is supposed to have once been subjected to the disc loading process by the optical disc drive 200. That is to say, the adjustment parameters 117 and adjustment result confirmation information 118 that are associated with the device identification information of the optical disc drive 200 are stored on the BD-RE disc 101 in the following example.

First, in Step 401, a BE coarse adjustment is made on the Layer L0. The BE coarse adjustment is carried out by the method that has already been described with reference to FIG. 15.

Next, in Step 402, FBAL/BE fine adjustments are made on the Layer L0. The FBAL/BE fine adjustments are carried out by the method that has already been described with reference to FIG. 16.

Next, in Step 403, read processing is performed on the DMA area 110 on the BD-RE disc 101.

Subsequently, in Step 404, address information representing the top of the valid Drive Area information 112 is extracted from the DDS information 113 in the DMA information that has been obtained in the previous processing step 403.

Then, in Step 405, the Drive Area information 112 is read out from the location specified by the address information that has been extracted in the previous processing step 404. In this manner, the BE adjustment results and temperature during the adjustment for the Layer L0 can be read out from the BD-RE disc 101.

Figure 17B:
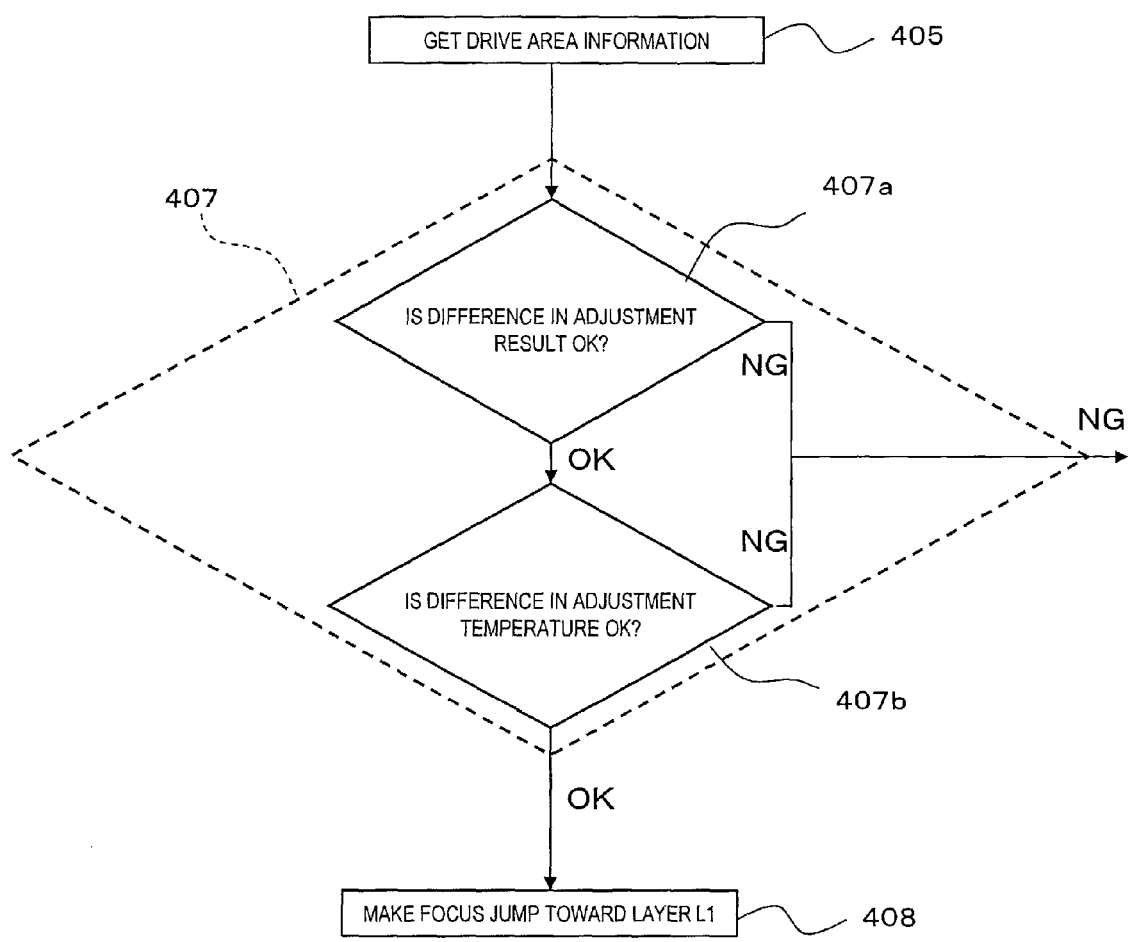
FIG. 17B is a flowchart showing the procedure of performing a disc loading process on an optical disc on which valid Drive Area information 112 is stored according to the first preferred embodiment.

Next, the BE adjustment results and temperature during the adjustment for the Layer L0 that have been read out from the BD-RE disc 101 are compared to the BE adjustment results for the Layer L0 that have been obtained in Step 402 and the current temperature, respectively, thereby ascertaining the validity of the Drive Area information 112. More specifically, as shown in FIG. 17B, the validity about the difference in BE adjustment result is judged in Step 407a. For example, if the difference between the previous and current BE adjustment results corresponds to a transmission layer thickness of 8 μm or less when converted, then it is determined to be OK and the process advances to Step 407b, in which the difference ΔT (° C.) between the temperature during adjustment that has been read out from the BD-RE disc 101 and the current temperature during the adjustment is calculated. If the temperature difference ΔT (° C.) thus calculated is equal to or smaller than 30° C., for example, then it is determined to be OK and the process advances to Step 408.

In each of the processing steps 407a and 407b, unless the decision condition is satisfied, then it is determined to be NG and the process advances to Step 411 shown in FIG. 17A.

Then, in Step 408, a focus jump operation toward the Layer L1 is carried out.

In Step 409, the difference ΔBE, figured out by subtracting the BE value for the Layer L0 from the BE value for the Layer L1 that has been read out from the BD-RE disc 101, is added to the BE coarsely adjusted value for the Layer L0 that has been obtained in the processing step 401. Nevertheless, this difference ΔBE is preferably corrected according to the temperature difference that has been calculated in Step 407b. This is because the BE value converted into a transmission layer thickness changes linearly with the temperature variation ΔT. And the reason why BE value changes linearly with the temperature is that when the temperature of the laser light source 217 varies, the wavelength of the light beam emitted changes and the magnitude of the spherical aberration also changes with the wavelength of the light beam. Suppose the best BE value at an adjustment process temperature of 30° C. corresponds to a transmission layer thickness of 100 μm when converted. In that case, when the temperature increases by ΔT° C., the best BE value will be 100 μm+0.8×ΔTμm. Such a rate of variation in BE with temperature may be either stored as a fixed value in a memory by the optical disc drive or calculated based on the adjustment results described above.

In this example, a factor of proportionality representing the temperature dependence of BE is 0.8×ΔT. Thus, the product of the difference ΔBE and 0.8×ΔT is preferably calculated as a "temperature correction difference", which is preferably added to the BE coarsely adjusted value for the Layer L0 that has been obtained in Step 401. By adding the difference that has been corrected based on the temperature variation ΔT to the current BE value for the Layer L0, the BE value at the FB2 point shown in FIG. 7 can be calculated.

Thereafter, the processing steps indicated by the arrows #2 through #4 in FIG. 7 (i.e., FBAL/BE fine adjustments) are carried out in Step 410. Since the processing indicated by the arrow #2 shown in FIG. 7 has been omitted from the FBAL/BE fine adjustments, this processing corresponds to a simplified mode of the FBAL/BE fine adjustments.

On the other hand, if the answer to the query step 407 is NG, the process advances to Step 411, in which a focus jump operation toward the Layer L1 is carried out. A normal BE coarse adjustment is made in the next processing step 412. And then the process advances to Step 413 to carry out normal FBAL/BE fine adjustments. In that case, the amount of time it will take to get the disc loading process done will naturally be as long as the conventional process.

Finally, in Step 414, the adjustment parameters and adjustment result confirmation information that have been obtained this time are stored in the Drive Area of the optical disc to end the disc loading process.

In the preferred embodiment described above, after adjustments have been made on the Layer L0, the DMA information is acquired. And the storage location in the Drive Area is found based on the DMA information, thereby getting the Drive Area information. Alternatively, before the DMA information is acquired, the Drive Area may be searched to find the storage location in the Drive Area and then the Drive Area information may be read out from that storage location in the Drive Area.

As described above, the best BE value changes with the distance from the surface of the disc to the information layer or with the temperature. Also, since the layers L0 and L1 are located at different distances from the surface of the disc, the sum of the best BE value for one information layer (e.g., Layer L0) and an offset will be the best BE value for the other information layer (e.g., Layer L1). In this case, the difference in best BE value between the layers L0 and L1 depends on the type of the given optical disc. That is why as for a disc that has been adjusted by the optical disc drive at least once, the difference in best BE value may be stored on the disc. Then, by making adjustments to obtain the best BE value on one of the two information layers, the best BE value for the other information layer can be calculated.

In this preferred embodiment, information about the difference in spherical aberration correction position between the layers L0 and L1 is used. However, the present invention is in no way limited to such a specific preferred embodiment. For example, if it has been determined that the result of the current adjustment on the Layer L0 is within a predetermined value away from that of the previous adjustment on the Layer L0, then the result of the previous adjustment on the Layer L1 may be used to make a correction with the current temperature and end the adjustments.

As described above, the FBAL/BE fine adjustments are made by changing both the focus position and the spherical aberration correction position in order to optimize the condition for reading data. The best focus position and best spherical aberration correction position for reading data may also change with a variation in the optical characteristic of the optical pickup with time and depending on the temperature condition. However, the best focus position for reading rarely changes significantly from one information layer to another. That is to say, the best focus position for one of the two information layers (e.g., Layer L1) should be located at a certain distance from the result of adjustment on the best focus position for the other information layer (e.g., Layer L0).

On the other hand, the best spherical aberration correction position for reading data is located within a predetermined range from the sum of the best spherical aberration correction position for the other information layer and an offset. That is why once the results of the FBAL/BE fine adjustments on the Layer L0 have been obtained, it is highly probable that the results of the FBAL/BE fine adjustments on the Layer L1 are located within a certain range from those of the FBAL/BE fine adjustments on the Layer L0. For that reason, the search range during the adjustments may be only the predetermined range from the results of adjustments on the Layer L0. Furthermore, the changes of the best focus positions and best BE values with the temperature variation are already reflected in the results of adjustments on the layer that has been subjected to the adjustments. Consequently, by determining whether or not the temperature during the previous adjustments is significantly different from the current temperature, the influence of the temperature on the best focus position and best BE value can be reduced.

As can be seen, by using the results of the current adjustment on the Layer L0 and those of the previous adjustments on the layers L0 and L1 in this manner, the search range while adjustments are made on the Layer L1 can be narrowed and the adjustments can be done quickly.

It should be noted that the adjustments to be made during the disc loading process are not limited to the BE coarse adjustment and the FBAL/BE fine adjustments as described for this preferred embodiment but may also be adjustment of the TE amplitude. If the results of the current adjustment on the Layer L0 and those of the previous adjustment on the Layer L0 as stored on the disc are included within a predetermined range, the results of the previous adjustment on the Layer L1 as stored on the disc may be adopted. Alternatively, those results of adjustment on the Layer L1 as stored on the disc may be subjected to some calculation and its outcome may also be adopted. The result of adjustment on the TE amplitude for a given layer is obtained by working out the average of the results of adjustments at respective radial locations. As a result, the time for moving the optical pickup over a long distance can be saved and the disc loading process time can be shortened significantly. Furthermore, if the results of the current adjustment on the Layer L0 and those of the previous adjustment on the Layer L0 as stored on the optical disc are included within a predetermined range, the results of the previous adjustment on the Layer L1 as stored on the disc may be adopted and the adjustment on the Layer L1 may be done by seeing if a proper characteristic has been realized.

Furthermore, even in a situation where the number of the information layers included is three or more, once those sorts of adjustments have been done on a particular one of the information layers, the adjustments can also be done on the other information layers in as short a time as in the first preferred embodiment described above.

Also, those information layers do not have to be stacked one upon the other along a normal to the information layers but may also be arranged side by side in the radial direction on the optical disc. For example, a first information layer may be arranged in an inner area on a single optical disc and a second information layer may be arranged so as to surround (i.e., outside of) the first information layer.

Embodiment 2

Hereinafter, another preferred embodiment of an optical disc drive according to the present invention will be described.

Figure 18:
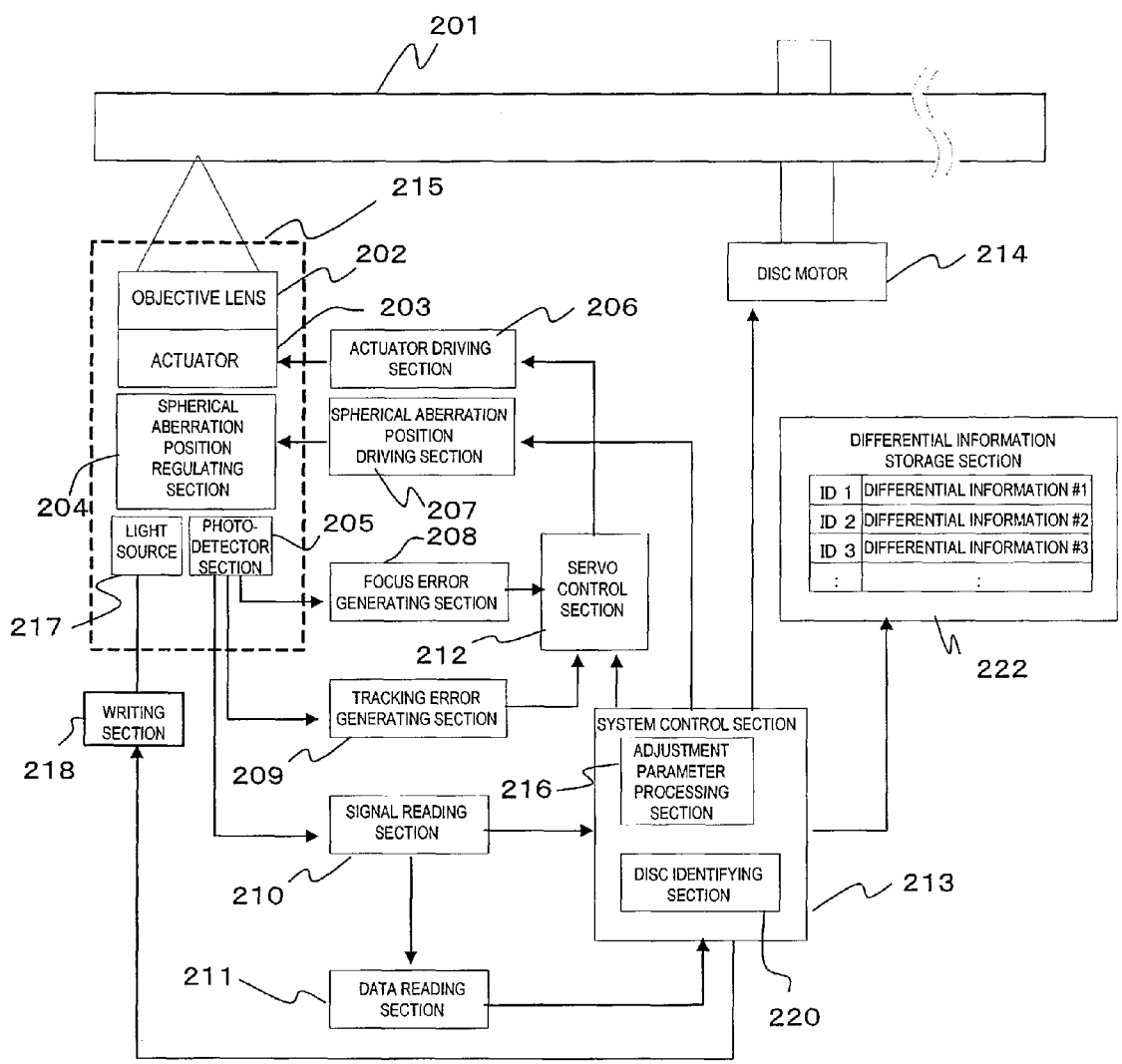
FIG. 18 shows another preferred embodiment of an optical disc drive according to the present invention.

Look at FIG. 18 first. The optical disc drive of this preferred embodiment is different from the drive shown in FIG. 12 in that the system control section 213 includes a disc identifying section 220 and a differential information storage section 222. As for the other components of the optical disc drive of this preferred embodiment that have similar functions to the counterparts shown in FIG. 12, the description thereof will be omitted herein to avoid redundancies.

If the given optical disc is a read-only one, the differential information cannot be stored on the optical disc and should be stored in a memory arranged in the optical disc drive.

In this preferred embodiment, appropriate differential information needs to be read out from the memory according to the type of the given optical disc. That is why the differential information storage section 222 stores the differential information in association with the respective optical discs' own identification information (IDs). And when the disc loading process is carried out, the ID of the optical disc that has been loaded into the optical disc drive is detected and differential information associated with that ID is read out from the memory. As described above, the differential information may include both a value about the Layer L0 and a value about the Layer L1, and does not have to be a piece of information representing the difference between those two values.

Figure 19:
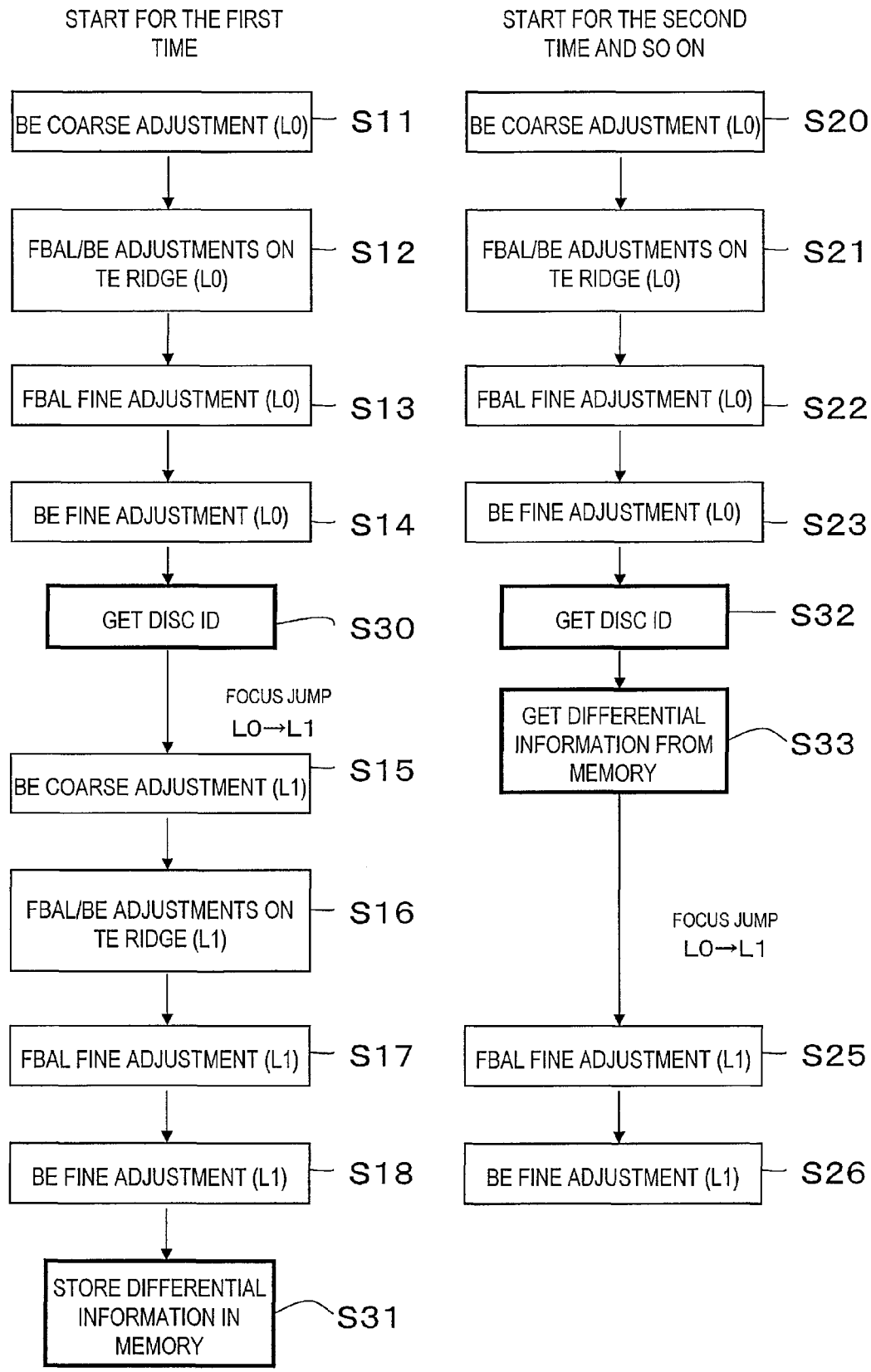
FIG. 19 is a flowchart showing the procedure of a disc loading process performed by an optical disc drive according to a second preferred embodiment of the present invention.

Hereinafter, the flow of a disc loading process according to this preferred embodiment will be described with reference to FIG. 19.

When the disc loading process is performed for the first time, the processing steps S11 through S14 are performed first to get the FBAL/BE adjustments done on the first information layer (Layer L0). Thereafter, in Step S30, a Disc ID unique to each disc is read out from the optical disc. The Disc ID may be the serial number of the optical disc and is a piece of information uniquely given to each optical disc.

Next, after a focus jump operation has been performed, the processing steps S15 to S18 are performed, thereby getting the FBAL/BE adjustments done on the second information layer (Layer L1). Thereafter, in Step S31, the differential information is stored in the differential information storage section 222 of the memory in association with the Disc ID that has been read out from the optical disc in Step S30. This memory may be a hard disc built in the optical disc drive or a memory card.

When the disc loading process is performed for the second time and so on, the processing steps S20 through S23 are performed first to get the FBAL/BE adjustments done on the first information layer (Layer L0). Thereafter, in Step S32, a Disc ID is read out from the optical disc. In this preferred embodiment, the disc identifying section 220 identifies the given optical disc by this Disc ID. Next, in Step S33, the differential information is gotten from the differential information storage section 222 of the memory. Since multiple pieces of differential information about a great number of optical discs may be stored in the differential information storage section 222, a piece of differential information associated with the disc ID gotten is selected in the differential information storage section 222. By adding the differential information that has been selected in this manner to the FBAL and BE that have been obtained for the first information layer (Layer L0), FBAL and BE values for the second information layer (Layer L1) can be calculated.

Thereafter, a focus jump operation is carried out and then processing steps S25 and S26 are performed to get the FBAL/BE adjustments done on the second information layer (Layer L1).

According to this preferred embodiment, the differential information is stored in the optical disc drive, and therefore, the disc loading process time can also be shortened even in playing a read-only multilayer optical disc.

In the preferred embodiment described above, the Disc ID is read out from the optical disc. However, the present invention is in no way limited to that specific preferred embodiment. As for an optical disc housed in a cartridge, for example, the cartridge may be given a unique ID and the Disc ID may be gotten from the cartridge during the disc loading process. Alternatively, the Disc ID may be either printed on the label side of the optical disc or stored in an IC chip provided for the optical disc and the Disc ID may be gotten from there during the disc loading process.

Embodiment 3

Hereinafter, a third preferred embodiment of an optical disc drive according to the present invention will be described.

In this preferred embodiment, the difference in the tilt of the optical disc, not the focus position FBAL and spherical aberration correction position BE, between the first and second information layers is used.

When an information layer is irradiated with a light beam by the optical pickup, the angle of incidence of the light beam on the information layer is preferably maintained at 90 degrees. However, the first and second information layers (layers L0 and L1) are not parallel to each other in every optical disc. Instead, the thickness of the transmission layer between the information layers could be non-uniform as shown in FIGS. 20(a) through 20(d).

FIGS. 20(a) and 20(b) schematically illustrate two different states of the same optical disc. In this optical disc, the layers L0 and L1 are not parallel to each other but have an interlayer gap that increases monotonically with the radial location (i.e., the distance from the center of the disc) on the optical disc. Specifically, in the state shown in FIG. 20(a), the Layer L0 has a zero tilt but the Layer L1 has a tilt of α degrees. On the other hand, in the example shown in FIG. 20(b), the Layer L0 also has a tilt of β degrees for some reason and the Layer L1 has a tilt of β+α degrees. In this manner, even if the same optical disc is loaded into the optical disc drive, that optical disc could have a different degree of tilt every time. Nevertheless, since the gap between the layers L0 and L1 is kept constant, the value (i.e., α degrees) obtained by subtracting the tilt of the Layer L0 from that of the Layer L1 remains the same between the states shown in FIGS. 20(a) and 20(b).

Such a tilt is measured on each of the layers L0 and L1 with the optical pickup moved in the radial direction on the optical disc. And during a read/write operation, the direction of the optical axis of the objective lens is adjusted according to the tilt measured. The tilt measurement, as well as adjustments of the focus position FBAL and spherical aberration correction position BE, is performed as a part of the disc loading process. More specifically, the tilt of each information layer can be measured by moving the objective lens in the optical pickup up and down at multiple different radial locations and detecting the heights of the information layers at those radial locations.

In the prior art, however, the distribution of tilts in the radial direction needs to be figured out on each of multiple information layers, thus making the disc loading process time too long. Specifically, in the example shown in FIG. 20(a), after the heights of the Layer L0 have been measured at the five radial locations of 24, 32, 40, 48 and 56 mm, those of the Layer L1 should be measured at the same five radial locations of 24, 32, 40, 48 and 56 mm. At each of these radial locations, the objective lens is moved up and down with the information layer actually irradiated with a light beam, and the height of the information layer is calculated based on that of the objective lens when the light beam is in focus with the information layer. For that reason, the greater the number of the information layers, the longer and longer the time it will take to get the processing done.

However, the present inventors paid special attention to the fact that the geometric arrangement of layers L0 and L1 in the same optical disc is unique to that optical disc and hardly varies. Thus, according to this preferred embodiment, the "differential information" is used for these tilts.

In the example shown in FIGS. 20(a) and 20(b), the difference in tilt between the layers L0 and L1 is always α degrees irrespective of the radial location. This difference is unique to, and invariable in, this optical disc. That is why once the tilt of the Layer L0 has been detected, the tilt of the Layer L1 can be figured out just by adding that difference to the tilt of the Layer L0 detected.

To shorten the disc loading process time in this manner, pieces of information about the respective tilts of the layers L0 and L1 should be stored in advance on the Layer L0 of the optical disc. In that case, the results of tilt measurements will be included in the adjustment parameters 117 shown in FIG. 11.

Next, look at FIGS. 20(c) and 20(d), which also show two different states of the same optical disc. In the example shown in FIG. 20(c), the Layer L0 has no tilt at all but the non-uniform gap between the information layers causes the tilt of the Layer L1 to change irregularly with the radial location. In this example, after the heights have been measured at a lot of radial locations on the Layer L1, the four radial locations of 24 mm, 30 mm, 40 mm and 52 mm, where the tilt changes significantly, are selected and the tilt can be calculated based on the heights of the information layer that have been measured at those radial locations. More specifically, by dividing the difference in the height of the Layer L1 between the radial locations of 24 mm and 30 mm by the interval between these two radial locations (i.e., 30 mm−24 mm=6 mm), a linearly approximated tilt value in the range between the two radial locations of 24 mm and 30 mm can be calculated. The calculated tilts have mutually different values θ, ι, ε and κ in the respective ranges as shown in the table. In the example shown in FIG. 20(d), the Layer L0 has a tilt of β degrees but the difference between the L1 and Layer L0s has not changed from that shown in FIG. 20(c).

As described above, even in a situation where the thickness of the transmission layer between the information storage layers of a multilayer optical disc is non-uniform, if the distribution of the transmission layer thicknesses in the radial direction is measured and stored, there is no need to carry out measurements for tilt correction on every information layer. That is to say, if the distribution of tilts in the radial direction has been figured out on the first information layer, that of the tilts in the radial direction on the second information layer can also be known just by adding the difference. As a result, the tilt adjustment on the second information layer can be simplified.

The geometric relation between the first and second information layers remains the same irrespective of the optical disc drive used. That is why once such a geometric relation has been detected and stored in either the optical disc itself or a memory in an optical disc drive, the effect of shortening the disc loading process time can be achieved. The geometric relation between the first and second information layers does not have to be defined by the tilt but may also be defined by the magnitude of deviation between their centers (i.e., the degree of eccentricity).

Embodiment 4

Figure 11:
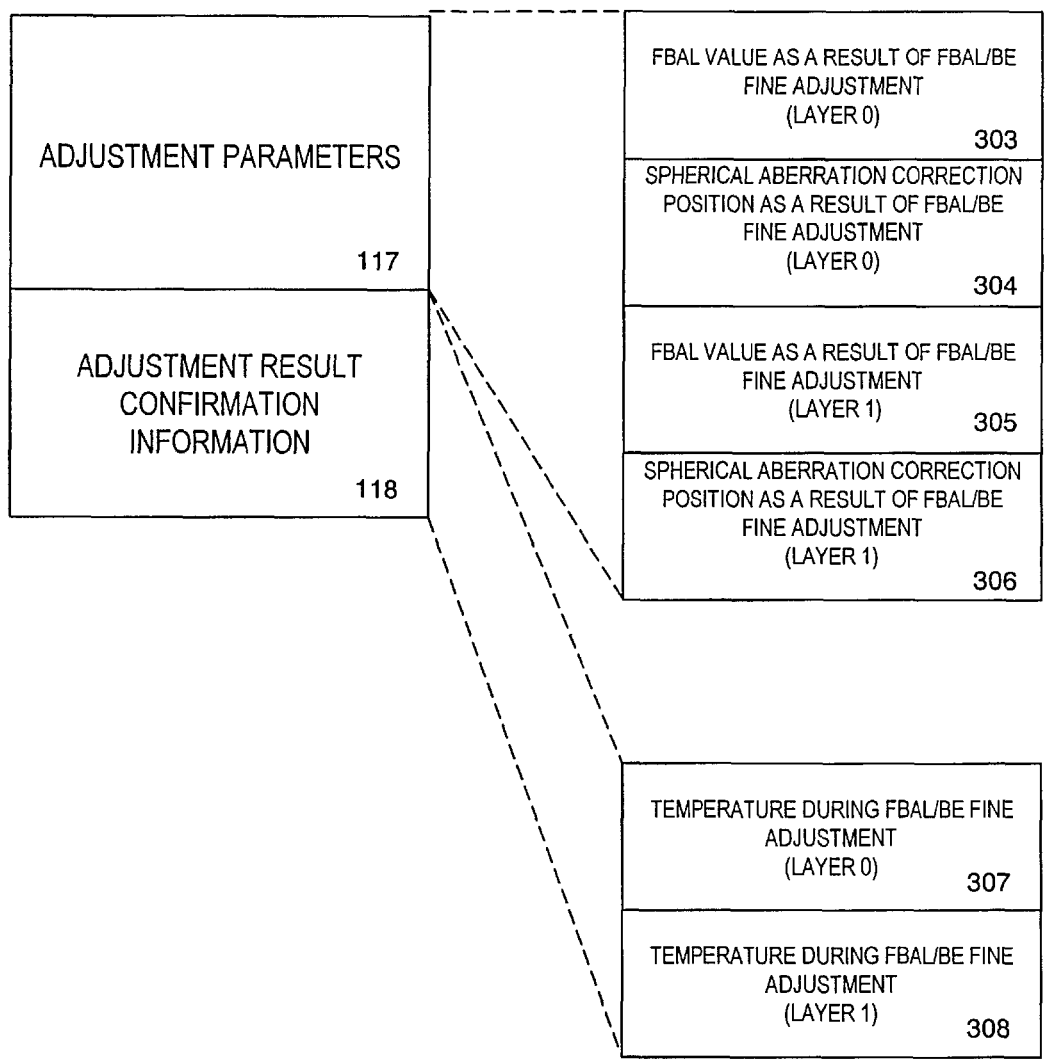
FIG. 11 schematically shows the format of valid Drive Area information according to a preferred embodiment of the present invention.

As is clear from the foregoing description, to achieve the effect of shortening the disc loading process time by the present invention, the values of the adjustment parameters 117 such as those shown in FIG. 11 need to be stored in the optical disc 201. Each optical disc 201 is removable and can be loaded into various optical disc drives. And each of those optical disc drives performs read or write processing according to the type of the optical disc loaded.

Figure 21A:
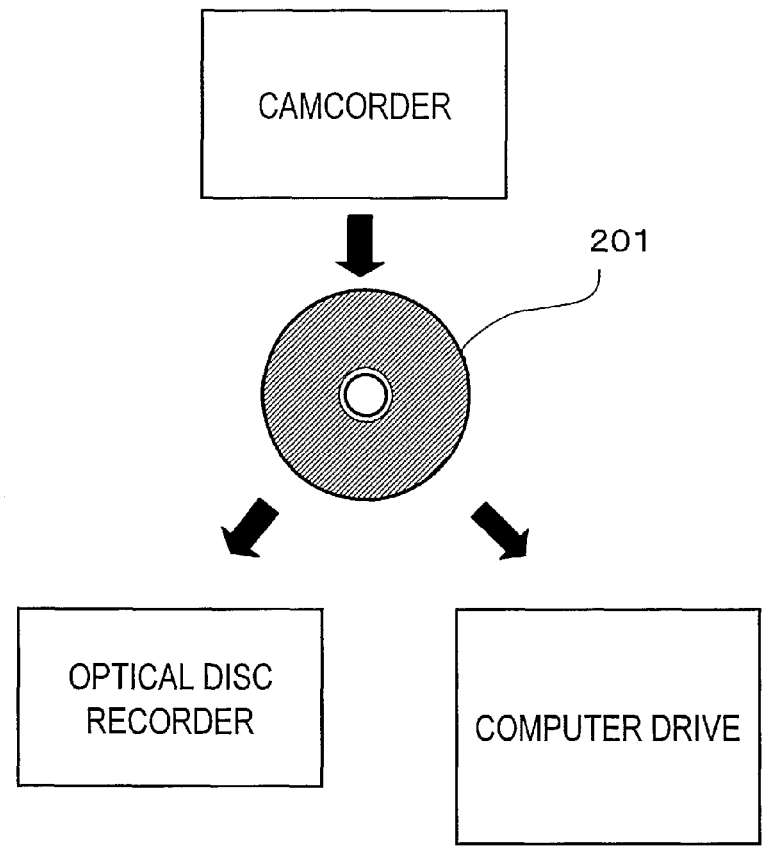
FIG. 21A shows a situation where the same optical disc is used in multiple different types of optical disc drives.

Suppose a camcorder that uses an optical disc as a storage medium has been loaded with an optical disc 201 on which no adjustment parameters 117 are stored and a disc loading process has been carried out on that disc for the first time as shown in FIG. 21A. The camcorder is a preferred embodiment of an optical disc drive according to the present invention.

In that case, the camcorder makes the BE coarse adjustment and FBAL/BE fine adjustments to obtain the best FBAL and BE values as results of the adjustments by the method that has already been described for the first preferred embodiment. Then, the camcorder writes the values of the adjustment parameters shown in FIG. 11 on the first information layer of the optical disc 201. The stored values of those adjustment parameters are preferably compliant with a predetermined standard so as to be usable as they are in any optical disc drive. As for the BE value, for example, if the BE value is represented as a numerical value that has been converted into a transmission layer thickness, the BE value may be used as it is in any of various optical disc drives.

In the example shown in FIG. 5(c), to minimize the spherical aberration on the Layer L1 (with a transmission layer thickness of 75 μm), the aberration correction lens should be moved to a position that is −1.11 mm away from its driver center position. Each optical disc drive can determine an appropriate aberration correction lens position by the given transmission layer thickness. That is why if the best BE value for the Layer L1 of a certain optical disc 201 has turned out to be 76.2 μm when converted into a transmission layer thickness, the value 76.2 μm may be stored as the best BE value on the optical disc 201.

The focus position may also be stored on the optical disc 201 as a focus position, of which the distance from the zero-cross point of the S-curve of a focus error signal has been adjusted to a certain standard.

In this manner, if the results of adjustments obtained during a disc loading process are adjusted to some standard so as to be usable in common by a plurality of optical disc drives before those results are written on the optical disc, then the results of adjustments obtained by one optical disc drive can be used easily in another optical disc drive.

In the example shown in FIG. 21A, if an optical disc on which the adjustment parameters are stored is loaded into another optical disc drive such as an optical disc recorder or a computer drive, that optical disc drive can get the disc loading process done in a shorter time. Nevertheless, to shorten the disc loading process time, that optical disc drive should be an optical disc drive according to the present invention.

Hereinafter, yet another preferred embodiment of an optical disc drive according to the present invention will be described.

In the example described above, the values of the adjustment parameters shown in FIG. 11 that are going to be stored are adjusted to some standard so as to be easily usable in common by a plurality of optical disc drives. However, the present invention is in no way limited to that specific preferred embodiment. In the preferred embodiment to be description below, the values of the adjustment parameters obtained by each optical disc drive are stored on an optical disc as they are (i.e., without changing their numerical values for use in the drive). According to this preferred embodiment, however, by storing a piece of information to identify the given optical disc drive (i.e., a device ID) and the adjustment parameters on the optical disc in association with each other, the values of the adjustment parameters that have been obtained with a particular optical disc drive may be corrected and then used in another optical disc drive.

Figure 22:
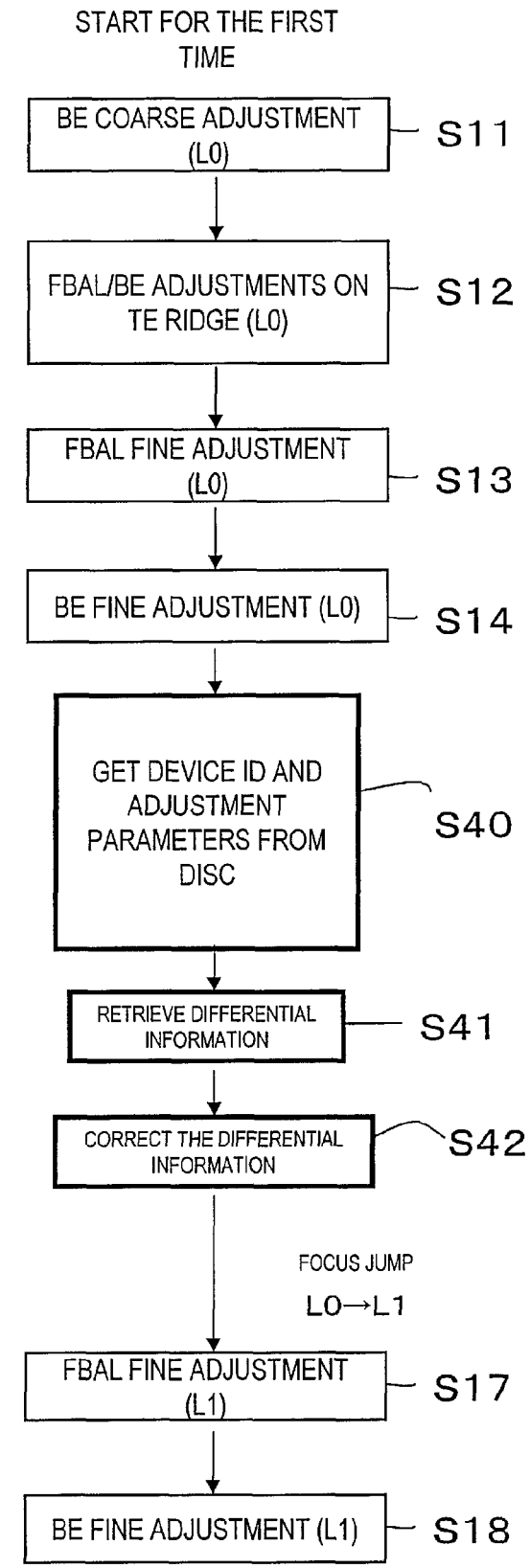
FIG. 22 is a flowchart showing a disc loading process performed by an optical disc drive according to still another preferred embodiment of the present invention.
Figure 23:
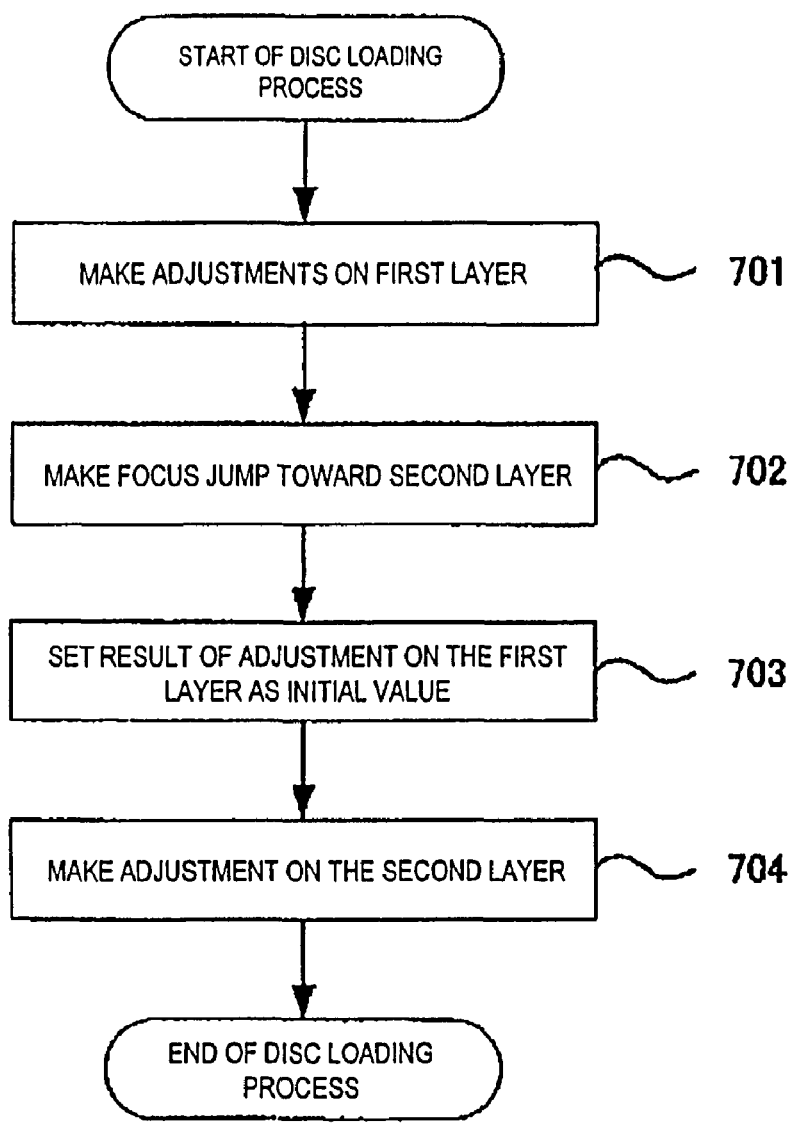
FIG. 23 is a flowchart showing the procedure of an optical disc loading process performed by an optical disc drive disclosed in Patent Document No. 1.

Hereinafter, the procedure of a disc loading process according to this preferred embodiment will be described with reference to FIG. 22.

First, an optical disc, of which the adjustment parameter values have already been figured out, and stored in the Drive Area 109 (see FIG. 10), by another optical disc drive, is provided and loaded into the optical disc drive of this preferred embodiment. The device ID of the optical disc drive of this preferred embodiment is supposed to be P200655555 and that of the optical disc drive that wrote those adjustment parameters on the optical disc is supposed to be P200612345.

This optical disc is subjected to a disc loading process for the first time by the optical disc drive of this preferred embodiment. Specifically, first, a BE coarse adjustment is carried out on the Layer L0 by the method described above in Step S11. Thereafter, FBAL/BE adjustments are performed on the TE ridge in Step S12 and then an FBAL fine adjustment is made in Step S13. Subsequently, a BE fine adjustment is performed in Step S14, thereby obtaining the adjustment results shown in the following Table 2:

TABLE 2

| Device ID | P200655555 |
|---|---|
| Result of FBAL fine adjustment (L0) | 0x2000 |
| Result of BE fine adjustment (L0) | 0x0380 |

By getting these adjustments done, data is ready to be retrieved from the Drive Area 109 that is provided on the Layer L0 of the optical disc. Next, not only the values of the adjustment parameters shown in FIG. 11 but also a piece of information to identify the drive that has written those adjustment parameter values (i.e., the device ID) are read out from the Drive Area of the optical disc in Step S40.

The following Table 3 shows exemplary numerical values of the device ID and adjustment parameters that have been stored in the Drive Area of the optical disc:

TABLE 3

| Device ID | P200612345 |
|---|---|
| FBAL (L0) | 0x1000 |
| BE (L0) | 0x0300 |
| FBAL (L1) | 0x2000 |
| BE (L1) | 0x0100 |

Next, the optical disc drive of this preferred embodiment calculates differences between the FBAL and BE values for the layers L0 and L1 that have been retrieved from the optical disc in Step S41. The differences may have the values shown in the following Table 4:

TABLE 4

| Device ID | P200612345 |
|---|---|
| FBAL difference (L1 − L0) | +0x1000 |
| BE difference (L1 − L0) | −0x0200 |

These numerical values representing the differences are associated with the optical disc drive (with device ID P200612345) that has obtained the adjustment parameters, and therefore, should be corrected before being used by the optical disc drive of this preferred embodiment (with device ID P200655555). Specifically, by adding the difference that has been corrected with a correction coefficient to the FBAL (L0) value that has been obtained as a result of the current disc loading process, the FBAL (L1) value can be calculated. In the same way, by adding the difference that has been corrected with a correction coefficient to the BE (L0) value that has been obtained as a result of the current disc loading process, the BE (L1) value can be calculated.

The correction coefficients $\chi$ and $\rho$ that will be needed to make corrections may be either stored along with the values of the adjustment parameters on the optical disc or saved in advance as table values in a memory in the system control section 213 (see FIG. 12) of the optical disc drive. If the correction coefficients $\chi$ and $\rho$ are saved in the memory in the system control section 213, the correction coefficients $\chi$ and $\rho$ need to be associated with the device ID. This is because the correction coefficients $\chi$ and $\rho$ change from one optical disc drive to another. The association between the correction coefficients $\chi$ and $\rho$ and the device ID may be represented by the following Table 5:

TABLE 5

| Device ID | FBAL correction coefficient $\chi$ | BE correction coefficient $\rho$ |
|---|---|---|
| P200655555 | $\chi a = +200$ | $\rho a = +184$ |
| P200612345 | $\chi b = +180$ | $\rho b = +170$ |

In this example, the correction coefficients $\chi$ a and $\rho$ a for the optical disc drive of this preferred embodiment (with device ID P200655555) are +200 and +184, respectively, and the correction coefficients $\chi$b and $\rho$b for the optical disc drive (with device ID P200612345) that has written the values of the adjustment parameters on the optical disc are +180 and +170, respectively. Consequently, the FBAL (L1) and BE (L1) values are calculated as shown in the following Table 6:

TABLE 6

| FBAL calculated (L1) | 0x2000 + 0x1000 × (200/180) |
|---|---|
| BE calculated (L1) | 0x0380 − 0x0200 × (184/170) |

These differences do not always have to be corrected by the exemplary method described above.

Next, a focus jump operation from the Layer L0 to the Layer L1 is performed and then FBAL/BE fine adjustments are carried out on the Layer L1 to cope with a variation in temperature (in Steps S17 and S18).

As described above, according to this preferred embodiment, even if the differential information stored on the optical disc has not been obtained by the given optical disc drive, that differential information can still be used effectively and the time for making the BE coarse adjustment on the Layer L1 and the time for making the FBAL/BE adjustments on the TE ridge can be saved.

If the values of adjustment parameters such as FBAL and BE have been written on an optical disc by the optical disc drive of this preferred embodiment, then any of various optical disc drives, loaded with such an optical disc, can get the disc loading process done in a shorter time as shown in FIG. 21A. That is why if multiple types of optical disc drives, including camcorders, video recorders, and computer drives, are produced and put on sale by the same manufacturer, the disc loading process time can always be shortened according to the present invention, no matter which of those optical disc drives, produced by the same manufacturer, is used. For that reason, the user is motivated to choose another optical disc drive to purchase from that group of products made by the same manufacturer, thus contributing to promoting the sales of those products provided by that manufacturer. Meanwhile, if a number of corporations made an agreement to standardize an optical disc drive according to the present invention and put it on the market individually, then the disc loading process time could be shortened by any of the drives produced and put on sale by those corporations.

Figure 21B:
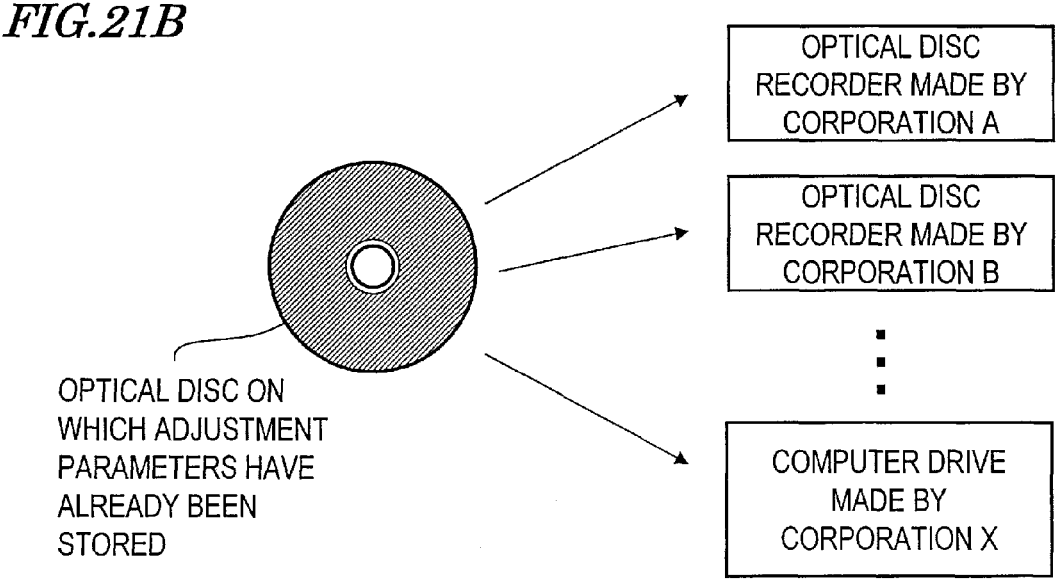
FIG. 21B shows another situation where the same optical disc is used in multiple different types of optical disc drives.

Optionally, when the optical disc is placed on the market (i.e., when the disc is shipped), the values of those adjustment parameters may be already stored on the disc. If the user purchases such an optical disc on which the adjustment parameters are already stored and loads it into any of various optical disc drives according to the present invention, the processing time can be shortened as shown in FIG. 21B even when the disc loading process is performed for the very first time. In the example shown in FIG. 21B, the adjustment parameters are preferably standardized, or pieces of information such as those shown in Table 4 are preferably shared by multiple corporations, such that a variety of devices put on sale by Corporations A, B, X and so on can all use such an optical disc.

As described above, once determined the values of adjustment parameters for the Layer L0 during a disc loading process, an optical disc drive according to a preferred embodiment of the present invention can determine adjustment parameters for the Layer L1 in a shorter time by using the differences in adjustment parameters between the layers L0 and L1 that have been determined during a previous disc loading process. As a result, the disc loading process can be done more quickly and the user does not have to wait so long until the drive gets ready to start playback.

Industrial Applicability

In performing a disc loading process on an optical disc with multiple layers, an optical disc drive according to the present invention makes adjustments on a first information layer and then gets adjustments on a second information layer done in a shorter time based on the results of the adjustments done on the first information layer and in accordance with differential information defined by the geometric arrangement of the first and second information layers. As a result, this optical disc drive should be very much convenient and useful for users.

The invention claimed is:

1. An optical disc drive with the ability to read and/or write data from/on an optical disc with multiple information layers including a first information layer and a second information layer, the drive comprising:
    an objective lens for converging a light beam;
    a lens actuator for driving the objective lens;
    a photodetector section, which receives the light beam that has been reflected from the optical disc and converts the received light beam into an electrical signal; and
    a control section for determining values of a first group of parameters, which are set to read data from the first information layer, and values of a second group of parameters, which are set to read data from the second information layer, during a disc loading process,
    wherein the first group of parameters includes first spherical aberration information that defines the magnitude of spherical aberration correction to be made on the light beam at the first information layer, and the second group of parameters includes second spherical aberration information that defines the magnitude of spherical aberration correction to be made on the light beam at the second information layer,
    wherein in performing the disc loading process, the control section determines values of the first group of parameters first, and then determines values of the second group of parameters based on the values of the first group of parameters that have just been determined during a current disc loading process and on correlation information, which represents a correlation between a first distance calculated based on the first spherical aberration information that was set during a previous disc loading process and a second distance calculated based on the second spherical aberration information that was set during the previous disc loading process, the first distance representing a distance from the surface of the light incoming side of the optical disc to the first information layer, and the second distance representing a distance from the surface of the light incoming side of the optical disc to the second information layer, and
    wherein the correlation information has been stored on the optical disc when the current disc loading process is started.

2. The optical disc drive of claim 1, wherein the correlation information is a differences between the first and second distances converted respectively from the values of the first and second groups of parameters that were set during the previous disc loading process.

3. The optical disc drive of claim 1, wherein the control section retrieves the first and second distances converted respectively from the values of the first and second groups of parameters that were set during the previous disc loading process from the first information layer of the optical disc.

4. The optical disc drive of claim 1, further comprising a memory for storing the values of the first and second groups of parameters, which were set during the previous disc loading process, in association with Disc ID information of the optical disc,
    wherein in performing the current disc loading process, the control section determines the values of the first group of parameters first, reads out the Disc ID information from the first information layer of the optical disc, and then retrieves the values of the first and second groups of parameters, which are associated with the Disc ID information, from the memory.

5. The optical disc drive of claim 1, wherein the first group of parameters includes a parameter that defines a converging state of the light beam at the first information layer when data is read from the first information layer, and
    wherein the second group of parameters includes a parameter that defines a converging state of the light beam at the second information layer when data is read from the second information layer.

6. The optical disc drive of claim 1, wherein the first group of parameters includes information about the tilt or the degree of eccentricity of the first information layer, and
    wherein the second group of parameters includes information about the tilt or the degree of eccentricity of the second information layer.

7. The optical disc drive of claim 1, wherein the control section determines, by the values of the first group of parameters that were set during the previous disc loading process, whether or not the correlation information should be used to determine the values of the second group of parameters during the current disc loading process.

8. The optical disc drive of claim 7, wherein the first group of parameters that were set during the previous disc loading process includes temperature information about a temperature during the previous disc loading process.

9. The optical disc drive of claim 7, wherein if it has been determined that the correlation information not be used, the control section determines the values of the second group of parameters by actually irradiating the second information layer of the optical disc with the light beam.

10. The optical disc drive of claim 1, wherein if the values of the first and second groups of parameters, which were set during the previous disc loading process, are not available during the current disc loading process, the control section determines the values of the second group of parameters by actually irradiating the second information layer of the optical disc with the light beam.

11. The optical disc drive of claim 1, wherein if the values of the first and second groups of parameters that were set during the previous disc loading process are stored in the first information layer of the optical disc and if those values were set by a different device from the given optical disc drive, the control section uses the correlation information after having corrected the information.

12. The optical disc drive of claim 1, wherein the control section gets a device ID, which identifies an optical disc drive that stored the values of the first and second groups of parameters on the first information layer of the optical disc, from the optical disc, and corrects the correlation information according to the device ID.

13. The optical disc drive of claim 1, wherein the control section stores the values of the first and second groups of parameters that have just been determined during the current disc loading process and/or the correlation information on the first information layer of the optical disc.

14. The optical disc drive of claim 1, wherein the control section corrects the values of the first and second groups of parameters, which have just been determined during the current disc loading process, such that another optical disc drive can use the values and then stores the values in the first information layer of the optical disc.

15. The optical disc drive of claim 1, wherein the control section stores not only the values of the first and second groups of parameters that have just been determined during the current disc loading process but also a device ID to identify the given optical disc drive on the first information layer of the optical disc.

16. The optical disc drive of claim 1, further comprising a memory for storing the values of the first and second groups of parameters in conjunction with a Disc ID that identifies their associated optical disc, wherein the control section stores the values of the first and second groups of parameters that have just been determined during the current disc loading process in the memory in association with the Disc ID of the optical disc.

17. The optical disc drive of claim 1, wherein the correlation information is stored on the optical disc by the optical disc drive or another optical disc drive.

18. The optical disc drive of claim 1, wherein the correlation information is the first and second distances which were converted during a previous disc loading process.

* * * * *